(12) United States Patent
Yamada

(10) Patent No.: US 8,654,426 B2
(45) Date of Patent: Feb. 18, 2014

(54) OPTICAL SCANNING DEVICE

(75) Inventor: Tsukasa Yamada, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 121 days.

(21) Appl. No.: 13/330,767

(22) Filed: Dec. 20, 2011

(65) Prior Publication Data

US 2012/0162739 A1  Jun. 28, 2012

(30) Foreign Application Priority Data

Dec. 22, 2010  (JP) ................ 2010-286758

(51) Int. Cl.
G02B 26/08  (2006.01)
(52) U.S. Cl.
USPC ...................................... 359/212.1
(58) Field of Classification Search
USPC .......... 359/198.1, 212.1, 213.1, 200.8, 214.1, 359/223.1–226.1
See application file for complete search history.

(56) References Cited

U.S. PATENT DOCUMENTS

2008/0054758 A1* 3/2008 Tsuboi et al. ............... 310/309

FOREIGN PATENT DOCUMENTS

| JP | 2001-249300 | 9/2001 |
| JP | 2001-264672 | 9/2001 |
| JP | 2004-325578 | 11/2004 |
| JP | 2010-128116 | 6/2010 |

* cited by examiner

Primary Examiner — Euncha Cherry
(74) Attorney, Agent, or Firm — IPUSA, PLLC

(57) ABSTRACT

An optical scanning device includes a mirror, a mirror supporting part to support the mirror on an upper surface, and a pair of torsion beams to support the mirror supporting part from both sides in an axis direction and to drive the mirror supporting part so as to swing the mirror supporting part around the axis by being twisted. The torsion beams include slits approximately parallel to the axis direction.

9 Claims, 30 Drawing Sheets

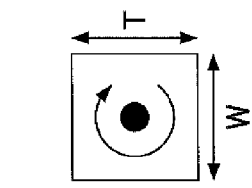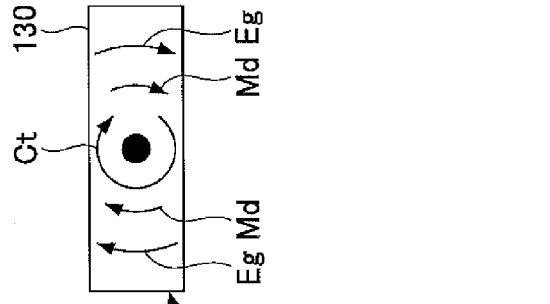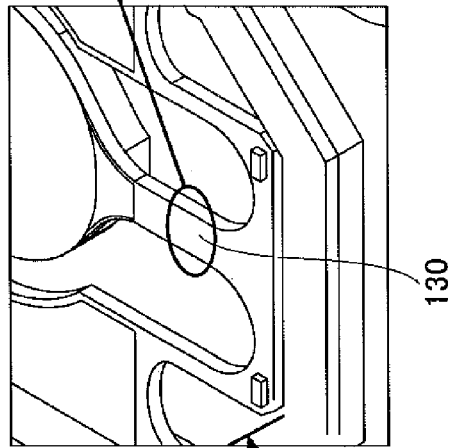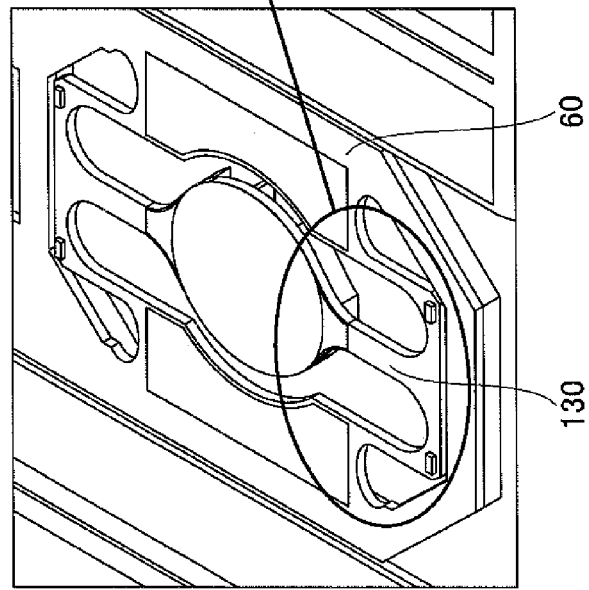

OPTICAL SCANNING DEVICE

CROSS-REFERENCE TO RELATED APPLICATIONS

This patent application is based upon and claims the benefit of priority of Japanese Patent Application No. 2010-286758 filed on Dec. 22, 2010, the entire contents of which are incorporated herein by reference.

BACKGROUND OF THE INVENTION

1. Field of the Invention

The present invention generally relates to an optical scanning device, and more specifically to an optical scanning device that supports a mirror supporting part from both sides in an axis direction by a pair of torsion beams, and drives the mirror supporting part so as to swing around the axis by twisting the torsion beams.

2. Description of the Related Art

Conventionally, an optical scanning device is known that includes a movable plate that reflects an incident light, a torsion beam that supports the movable plate in a rotatable way around an axial direction, and a drive part that gives a drive force in a twisting direction to the torsion beam, wherein a rib is formed at least in the vicinity of a connection between the movable plate and the torsion beam, as disclosed in Japanese Patent Application Laid-Open Publication No. 2010-128116 (which is hereinafter called "Patent Document 1").

The optical scanning device disclosed in Patent Document 1 aims at suppressing a dynamic distortion of a reflecting plane without increasing a weight of the movable plate.

In recent years, optical scanning devices tend to be required to have higher resolution. To implement the higher resolution, a resonant frequency is needed to be raised, for which a rigidity of a torsion beam (which may be called a "torsion bar") is needed to be increased.

Here, if a width of the torsion beam is broadened to improve the rigidity, since a deformed state of the torsion beam differs depending on a distance from a center axis of the torsion, a problem of nonlinearity of a displacement is caused.

In Patent Document 1, since such a problem of the nonlinear oscillation is not considered at all, if the resonant frequency is raised, the problem of the nonlinearity of the displacement is caused. Moreover, in the configuration described in Patent Document 1, an effect of preventing a mirror deformation is obtained, but a stress caused by the oscillation is not blocked, so if the resonant frequency is raised, the mirror deformation is not prevented.

SUMMARY OF THE INVENTION

Embodiments of the present invention provide a novel and useful optical scanning device solving one or more of the problems discussed above.

More specifically, embodiments of the present invention provide an optical scanning device to be able to reduce an occurrence of a nonlinear oscillation and a generated stress, and to be able to prevent a deformation of a mirror even if driven at a high resonant frequency.

According to one aspect of the present invention, an optical scanning device is provided, the device including:

a mirror;

a mirror supporting part to support the mirror on an upper surface; and a pair of torsion beams to support the mirror supporting part from both sides in an axis direction and to drive the mirror supporting part so as to swing the mirror supporting part around the axis by being twisted themselves, wherein each of the torsion beams includes a slit approximately parallel to the axis direction.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 3A is a view showing a configuration inside a movable frame of a comparative example;

FIG. 3B is a perspective view showing an enlarged torsion beam of the optical scanning device of the comparative example;

FIG. 3C is a cross-sectional view of the torsion beam of the optical scanning device of the comparative example;

FIG. 3D is a view showing a beam with a square cross section;

DETAILED DESCRIPTION OF THE PREFERRED EMBODIMENTS

A description is given below, with reference to drawings of embodiments of the present invention.

First Embodiment (Overall Structure)

Figure 1A:
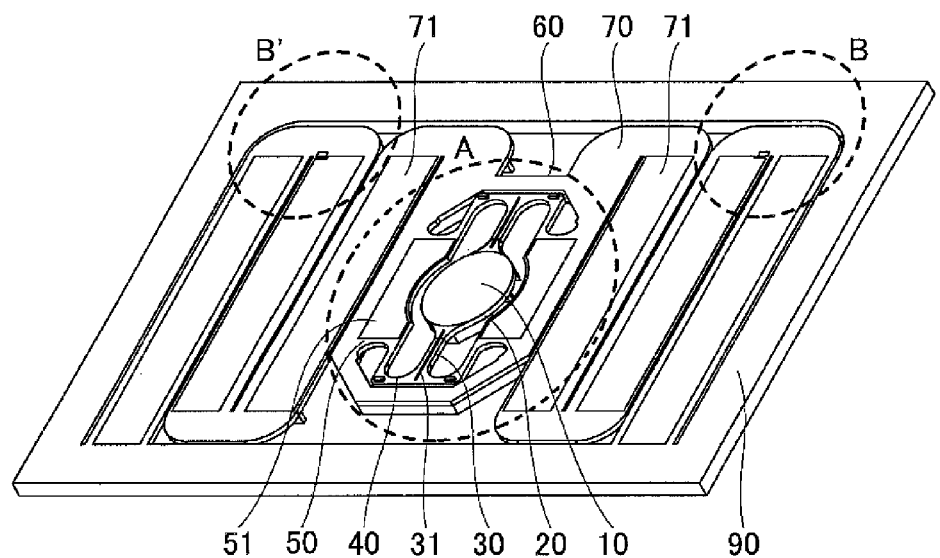
FIG. 1A is a top perspective view showing an example of an optical scanning device of a first embodiment of the present invention.
Figure 1B:
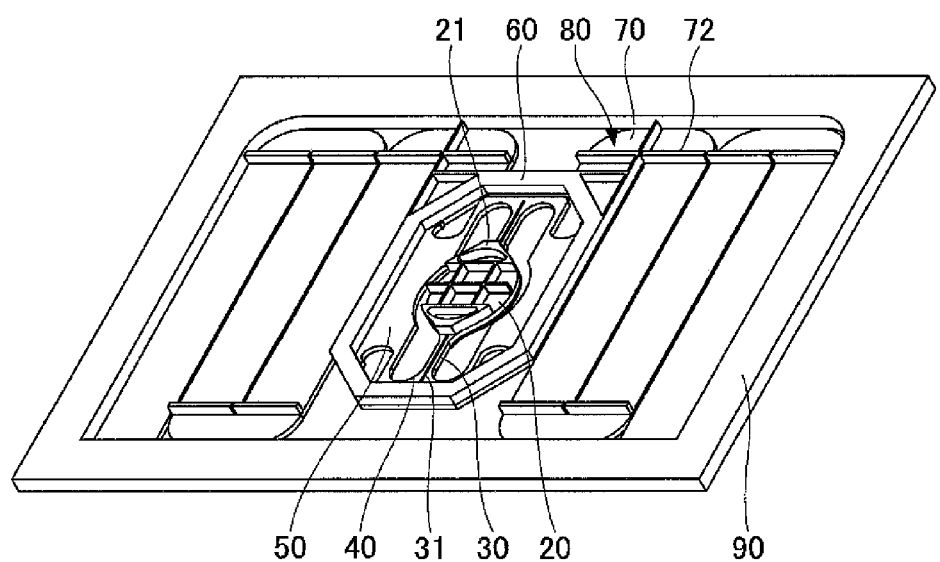
FIG. 1B is a bottom perspective view showing an example of the optical scanning device of the first embodiment of the present invention.

FIGS. 1A and 1B are perspective views showing an example of a configuration of an optical scanning device of a first embodiment of the present invention. FIG. 1A is a top perspective view showing an example of the optical scanning device of the first embodiment. FIG. 1B is a bottom perspective view showing an example of the optical scanning device of the first embodiment.

In FIGS. 1A and 1B, the optical scanning device of the present invention includes a mirror 10, a mirror supporting part 20, torsion beams 30, coupling beams 40, first drive beams 50, a movable frame 60, second drive beams 70, crosstalk preventing ribs 80, and a fixed frame 90. The torsion beams 30 include a slit 31. Moreover, as shown in FIG. 1A, the first drive beams 50 include a drive source 51, and the second drive beams 70 include a drive source 71. Furthermore, as shown in FIG. 1B, a rib is provided on the back side of the mirror supporting part 20, and harmonic superposition preventing ribs 72 are provided on the back side of the second drive beams 70.

In FIGS. 1A and 1B, the mirror 10 is supported on the upper surface of the mirror supporting part 20, and the mirror supporting part 20 is connected to edges of the torsion beams 30 located on both sides of the mirror supporting part 20. The torsion beams 30 form a rocking axis, extend in an axial direction, and support the mirror supporting part 20 from both sides in the axial direction. By twisting the torsion beams 30, the mirror 10 supported by the mirror supporting part 20 swings and performs an operation of deflecting a reflected light of an incident light on the mirror 10. The torsion beams 30 are coupled and supported by the coupling beams 40, and connected to the first drive beams 50. The first drive beams 50, the coupling beams 40, the torsion beams 30, the mirror supporting part 20 and the mirror 10 are surrounded by the movable frame 60. The first drive beams 50 are supported by the movable frame 60 at one side, and extend inward so as to be connected to the coupling beams 40. Two first drive beams 50 are provided so as to sandwich the mirror 10 and the mirror supporting part 20 in a direction perpendicular to the torsion beams 30. A thin film of a piezoelectric device is formed on the upper surface of the first drive beam 50 as the drive source 51. Since the piezoelectric device expands and contracts depending on the polarity of an applied voltage, by alternately applying different voltages in phase to the left first drive beam 50 and the right first drive beam 50, the first drive beams 50 on the left and right of the mirror alternately oscillate up and down oppositely, by which the mirror 10 can be swung around the axis, making the torsion beams 30 serve as a rocking axis or a rotation axis. The direction where the mirror 10 swings around the torsion beams 30 is hereinafter called a "horizontal direction". Generally speaking, the horizontal direction corresponds to a horizontal direction of a screen for projection. In the screen, a lateral direction is generally called the horizontal direction. For example, resonant drive may be used for a horizontal drive by the first drive beams 50, and the mirror 10 may be driven and swung at high speed. Moreover, one edge of each of the second drive beams 70 is coupled to the outside of the movable frame 60. By applying different polarities of voltages to the adjacent drive sources 71 per rectangle unit, the adjacent rectangular beams are recurved in vertically opposite directions, and an integration of an up-and-down motion of the rectangular beams can be transmitted to the movable frame 60. Then the mirror 10 can be swung in a direction perpendicular to the horizontal direction, in a vertical direction. As mentioned above, the vertical direction generally corresponds to a vertical direction of a screen for projection, a longitudinal direction of the screen. For example, the second drive beams 70 may generate the drive force by non-resonant oscillation.

The optical scanning device of the present embodiment may be implemented by various materials and processing methods as long as the optical scanning device has the above mentioned configuration and the configuration is practicable. For example, the optical scanning device of the present embodiment may be implemented by Micro Electro Machine System (MEMS) technology by using semiconductor fabrication. For example, if a Silicon On Insulator (SOI) substrate is used, by processing the substrate so as to leave only a silicon substrate on the upper side as thin beam parts, and by processing the substrate so as to also leave a silicon substrate on the back side as thick frames and ribs, a structural body of the optical scanning device can be produced readily.

The optical scanning device of the present embodiment can be configured as a piezoelectric dual-axis drive type actuator mountable on a micro projector, and can be inexpensively produced to have a small size and a high performance. Here, for example, the "small size" means a height not more than 7 mm, and the "high performance" means that a high-speed drawing can be performed on an A3 size screen at a 50 cm distance at an XGA resolution (i.e., eXtended Graphic Array, a resolution of 1024*768 pixels) or 720 p. The optical scanning device of the present embodiment may be, for example, configured as a small-size and high-performance dual axis drive type micro mirror actuator including a non-resonant drive type actuator mechanism that swings in a vertical direction at a mechanical angle±9 degrees at 60 Hz in a saw-tooth pattern and a resonant drive type actuator mechanism that swings in a horizontal direction at a mechanical angle±12 degrees at a resonant frequency 25 kHz.

Figure 2A:
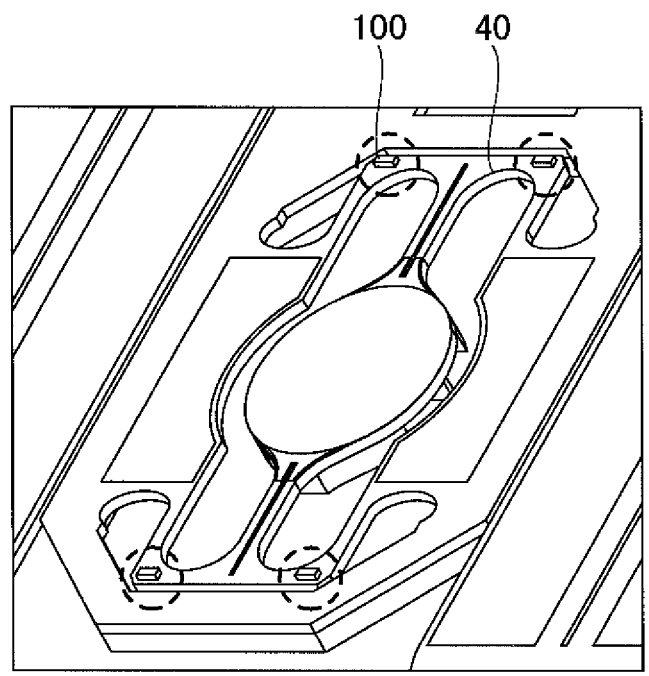
FIG. 2A is a enlarged view showing a part A of FIG. 1A.
Figure 2B:
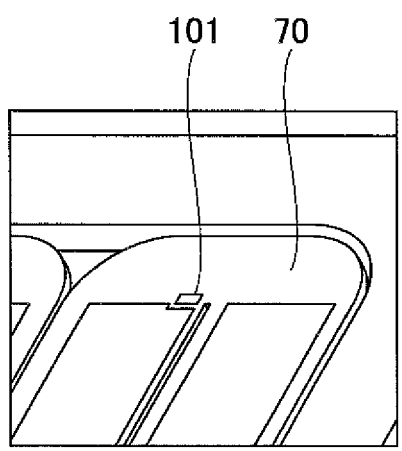
FIG. 2B is a enlarged view showing a part B of FIG. 1A.

FIGS. 2A and 2B are enlarged views showing A part and B part of FIG. 1A. FIG. 2A is an enlarged view showing the A part of FIG. 1A. FIG. 2B is an enlarged view showing the B part of FIG. 1A.

In FIG. 2A, four of mirror horizontal angle sensors 100 are provided on the coupling beams 40. The mirror horizontal angle sensors 100 are sensors that detect an inclination angle of the mirror 10 in a horizontal direction. Since the coupling beams 40 reflect the inclination angle of the mirror 10 in the horizontal direction, by providing the mirror horizontal angle sensors 100 on the coupling beams 40, the inclination angle of the mirror 10 of the horizontal direction can be detected. The mirror horizontal angle sensors 100 may be, for example, configured to have a thin film of a piezoelectric device, to detect a voltage excited in the thin film of the piezoelectric device according to the inclination angle, and to detect the inclination angle of the horizontal direction.

In FIG. 2B, a mirror vertical angle sensor 101 is provided on the second drive beam 70. Since a drive in a vertical direction is reflected in a motion of the second drive beams 70, for example, the mirror vertical angle sensor 101 may be provided on the second beam 70. For example, the mirror vertical angle sensor 101 may be also configured to use a piezoelectric device as mentioned above.

Next, with respect to details of the optical scanning device of the present embodiment, descriptions are given for respective component parts sequentially. Here, in the optical scanning device of the first embodiment, if there is a practical example such as measurement results, the example is taken and referred to for each component part.

(Slit Structure)

FIGS. 3A through 3D are views showing a comparative example to illustrate a slit structure of the optical scanning device of the present embodiment. FIGS. 3A through 3D show an optical scanning device of the comparative example including torsion beams 130 in which a slit 31 is not formed, different from the present embodiment. Here, in FIGS. 3A through 3D, numerals similar to FIGS. 1 and 2 are put to components similar to ones of the optical scanning device of the present embodiment, and different numerals are put to components different from the optical scanning device of the present embodiment.

FIG. 3A is a view showing a configuration within a movable frame 60 of the optical scanning device of the comparative example. As shown in FIG. 3A, the optical scanning device of the comparative example differs from the optical scanning device of the present embodiment in that the slits 31 are not formed in torsion beams 130, inside the movable frame 60.

FIG. 3B is an enlarged perspective view showing the torsion beams 130 of the optical scanning device of the comparative example. As shown in FIG. 3B, the torsion beams 130 have a lamellar shape with a greater width compared to a thickness. Since high resolution is required in recent years, scanning many pixels per unit time is needed, and speeding up the swinging drive for scanning is needed. To implement speeding up, the resonant frequency to drive the mirror 10 has to be raised. To do this, rigidity of the torsion beams 130 have to be increased. This is because if the optical scanning device is configured by using a semiconductor process with MEMS technology, since the thickness of the thin parts is determined by the rigidity related to swinging sensitivity of the second drive beams 70 and a primary resonant frequency fo, and all of the thin parts are configured to be constant, the horizontal width of the torsion beams 130 needs to be increased in order to raise the rigidity.

FIG. 3C is a cross-sectional view of the torsion beam 130 of the optical scanning device of the comparative example. As shown in FIG. 3C, the cross-section of the torsion beam 130 has a rectangle shape with a greater width compared to the thickness. This is because, as mentioned above, the beam width of the torsion beams 130 is broadened and the rigidity is improved. Then, when the torsion beam 130 is twisted, a center part Ct, an edge Eg and a middle part Md deform differently depending on the position. If the mirror angle is largely changed by twisting, the differences of the deformation state among the positions Ct, Md and Eg appear as a nonlinear displacement.

Figure 4A:
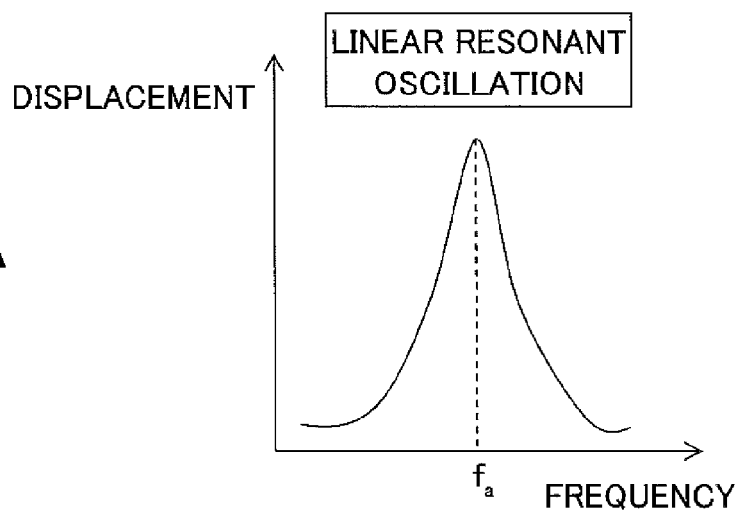
FIG. 4A is a view showing an example of a frequency/displacement characteristic of a linear oscillation.
Figure 4B:
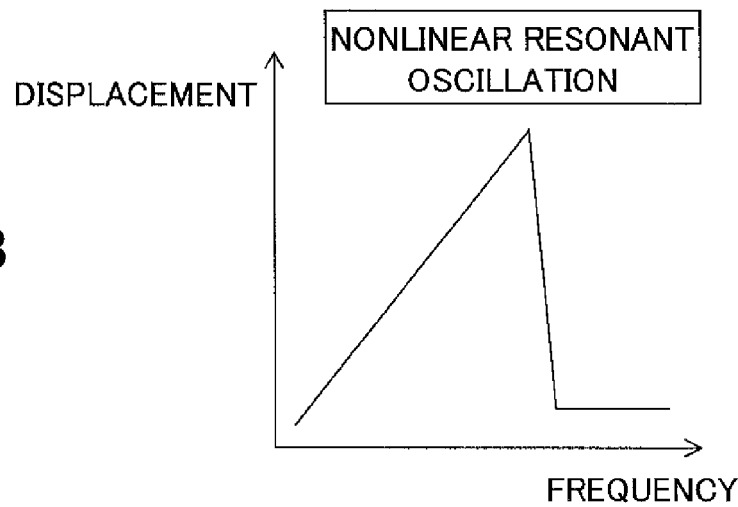
FIG. 4B is a view showing an example of a frequency/displacement characteristic of a nonlinear oscillation.
Figure 4C:
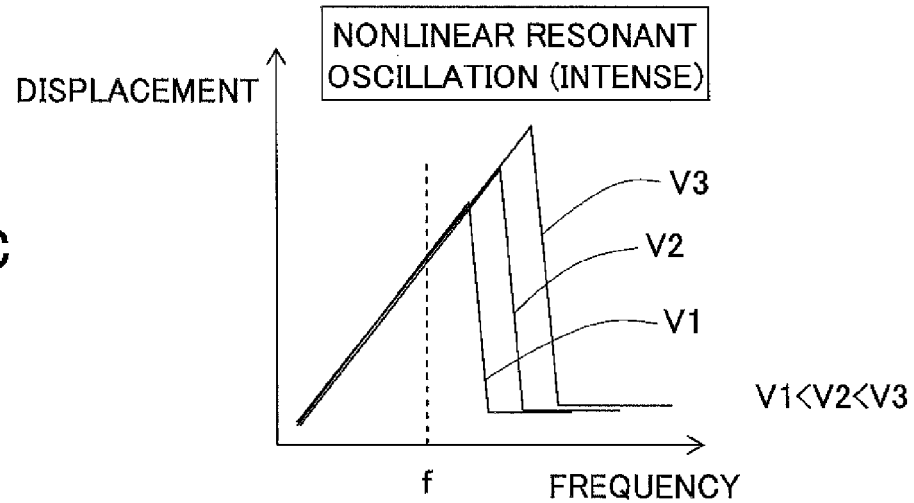
FIG. 4C is a view showing an example of a frequency/displacement characteristic when the nonlinear oscillation strongly appears.

FIGS. 4A through 4C are views showing frequency/displacement characteristics of a linear resonant oscillation and a nonlinear resonant oscillation. FIG. 4A is a view showing an example of a frequency/displacement characteristic of a linear resonant oscillation. As shown in FIG. 4A, the linear resonant oscillation performs a symmetric oscillation, making a resonant frequency fa the center.

FIG. 4B is a view showing a frequency/displacement characteristic of a nonlinear oscillation. As shown in FIG. 4B, in the nonlinear resonant oscillation, a balance of the right and left breaks, and a mountain of the resonant frequency leans to the right or left. In FIG. 4B, the mountain of the resonant frequency leans toward the right.

FIG. 4C is a view showing examples of frequency/displacement if the nonlinear resonant oscillation intensely appears. As shown in FIG. 4C, the biggest problem when the nonlinear resonant oscillation intensely appears is that a displacement at the drive frequency f does not change even if the drive voltage is changed in a range from V1 to V3, making the drive frequency f constant. In other words, because the peak is inclined, the displacement is increased or decreased in the inclined direction even though the drive voltage is increased or decreased, so there is a phenomenon where the displacement is not increased and decreased at all at a point of the frequency f. This prevents a projection size of a laser light from being changed freely by adjusting an applied voltage.

Next, the description is given, with reference to FIG. 3D. FIG. 3D is a view showing a beam with a square cross section. In FIG. 3D, the width is shown by W, and the thickness is shown by T. The most efficient measures to prevent the nonlinearity are to change the cross-sectional shape of the beam from the rectangle shown in FIG. 3C to the square shown in FIG. 3D.

However, in order to make the cross-sectional shape a square while keeping a drive frequency constant, the thickness T needs to be increased from the rectangular shape in FIG. 3C. However, if the thickness T is simply increased, the thickness of the second drive beams 70 that are the vertical non-resonant drive structure is also increased, and desired vertical drive voltage sensitivity cannot be obtained.

Therefore, in the optical scanning device of the present embodiment, the slit 31 is provided in the torsion beam 30; the cross sections on both sides of the slit 31 are respectively made a square; the width of the torsion beam 30 is broadened as a whole; and the torsion beam 30 is configured to maintain the rigidity.

Figure 5C:
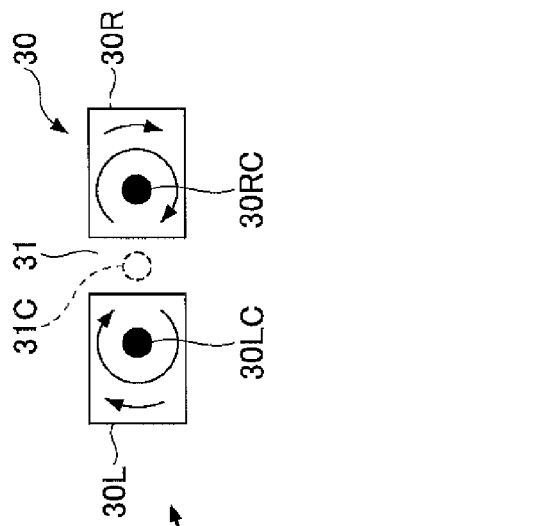
FIG. 5C is a view showing a cross-sectional configuration of the torsion beam of the optical scanning device of the first embodiment.
Figure 5B:
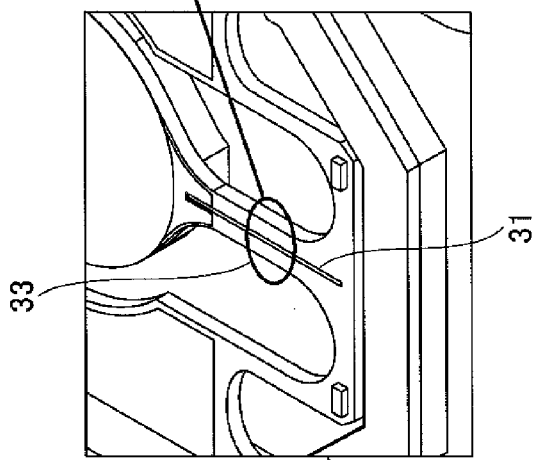
FIG. 5B is an enlarged view of the torsion beam of the optical scanning device of the first embodiment.
Figure 5A:
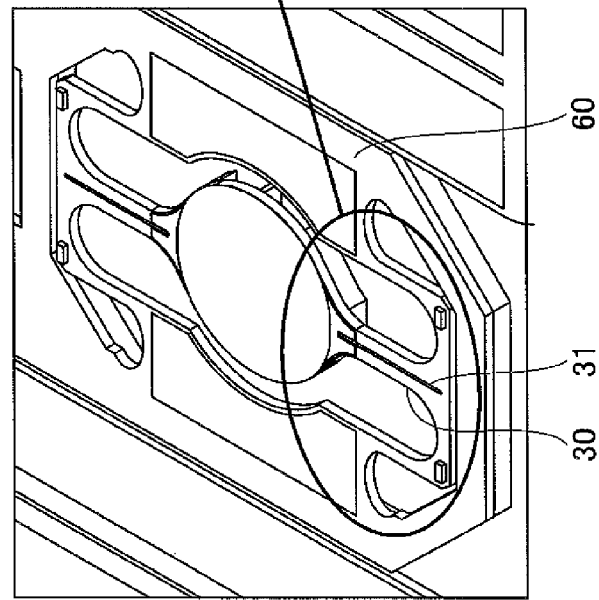
FIG. 5A is a view showing a configuration inside a movable frame of the optical scanning device of the first embodiment.

FIGS. 5A through 5C are views to explain the torsion beams 30 of the optical scanning device of the first embodiment. FIG. 5A is a view showing an inside configuration of the movable frame 60 of the optical scanning device of the first embodiment. In FIG. 5A, each of the torsion beams 30 of the present embodiment includes the slit 31.

FIG. 5B is an enlarged view showing the torsion beam 30 of the optical scanning device of the first embodiment. As shown in FIG. 5B, the torsion beam 30 of the optical scanning device of the present embodiment includes the slit 31 parallel to the axial direction. In FIG. 5B, since only a single slit 31 is provided in the center of the torsion beam 30, the slit 31 is provided in a position corresponding to the rocking axis. Moreover, the slit 31 does not reach the inside edge or the outside edge of the torsion beam 30, and is not configured to divide the torsion beam 30.

FIG. 5C is a view showing an example of a cross-sectional configuration of the torsion beam 30 of the optical scanning device of the first embodiment. As shown in FIG. 5C, by forming the slit 31 in the center of the torsion beam 30, the torsion beam 30 is divided into the left torsion beam 30L and the right torsion beam 30R in the cross section including the slit 31. Both the left torsion beam 30L and the right torsion beam 30R have a cross section similar to a square. Accordingly, a rotation center 30LC of the left torsion beam 30L and a rotation center 30RC of the right torsion beam 30R both become the center of respective torsion beams 30L, 30R, and a difference by a displacement does not occur, by which the nonlinear oscillation can be reduced. Furthermore, the torsion beam 30 is assumed to swing around an assumed rotation center 31C as a whole, making it possible for the mirror 10 to swing in a horizontal direction in a desired way.

In this manner, according to the optical scanning device of the present embodiment, by providing the slit 31 parallel to the axial direction in the torsion beam 30, and by making the respective divided torsion beams 30L, 30R have a shape similar to a square in a cross section including the slit 31, generation of nonlinear oscillation is suppressed.

First Example

Figure 6A:
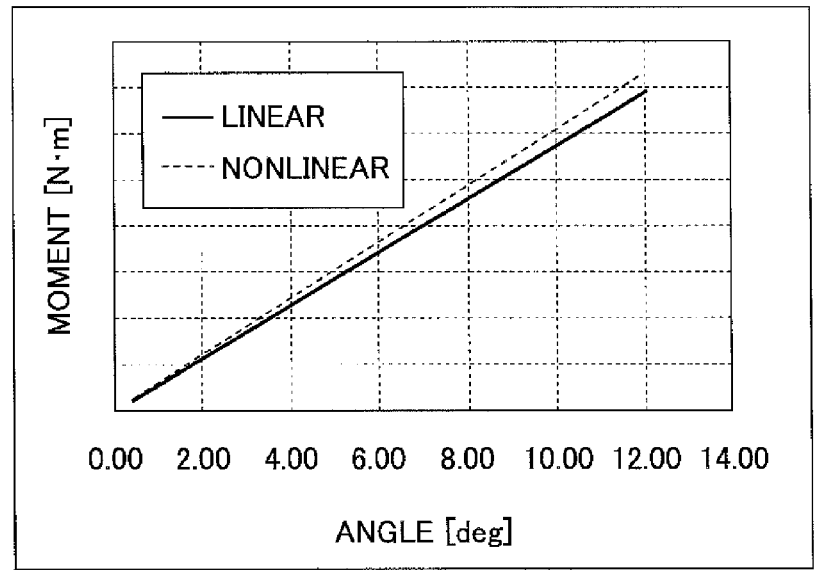
FIG. 6A is a view showing performance results of an optical scanning device of a comparative example without a slit.
Figure 6B:
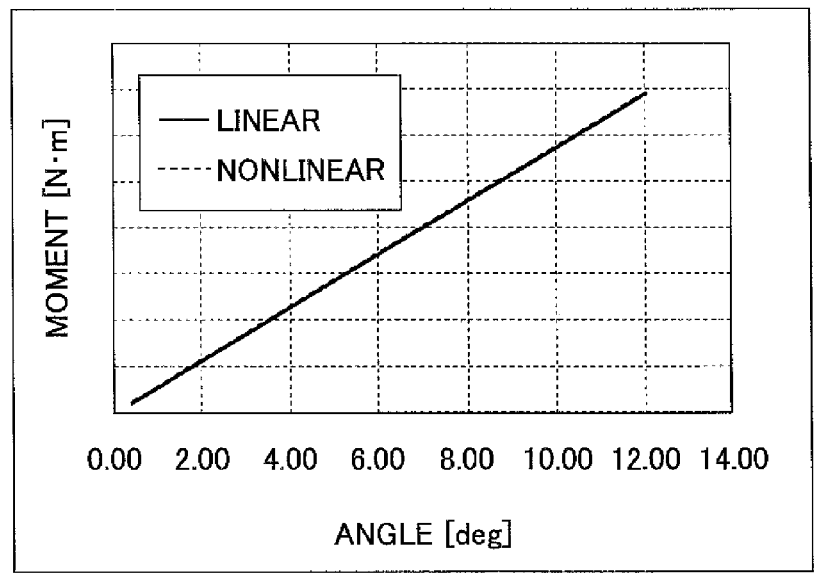
FIG. 6B is a view showing performance results of an optical scanning device of a first example including a slit.

FIGS. 6A and 6B are views showing performance results of an optical scanning device of a first example. FIG. 6A is a view showing performance results of an optical scanning device of a comparative example without the slit 31. FIG. 6B is a view showing performance results of an optical scanning device of the first example with the slit 31.

FIG. 6A shows moments in a case where the optical scanning device of the comparative example is displaced linearly and nonlinearly. FIG. 6A shows if the moments between the linearity and the nonlinearity disagree, the nonlinearity is intense, and if the moments between the linearity and the nonlinearity agree, the nonlinearity does not occur. In FIG. 6A, the moments of the linearity and the nonlinearity do not overlap, the optical scanning device of the comparative example including the torsion beams 130 without the slits 31 shows a characteristic with intense nonlinearity.

On the other hand, FIG. 6B shows moments in a case where the optical scanning device of the first example having a configuration similar to the first embodiment is displaced linearly and nonlinearly. In FIG. 6B, the moments of the linearity and the nonlinearity overlap with each other, which shows that nonlinearity does not occur.

Figure 7A:
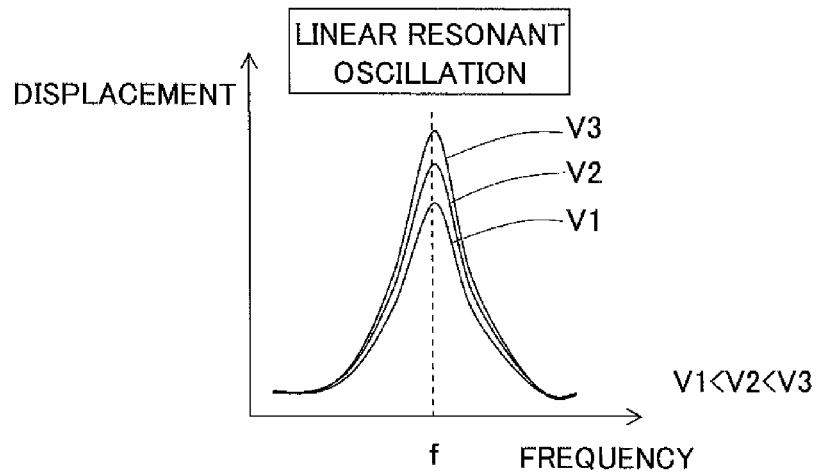
FIG. 7A is a view showing a displacement/frequency characteristic of the optical scanning device of the first embodiment.
Figure 7B:
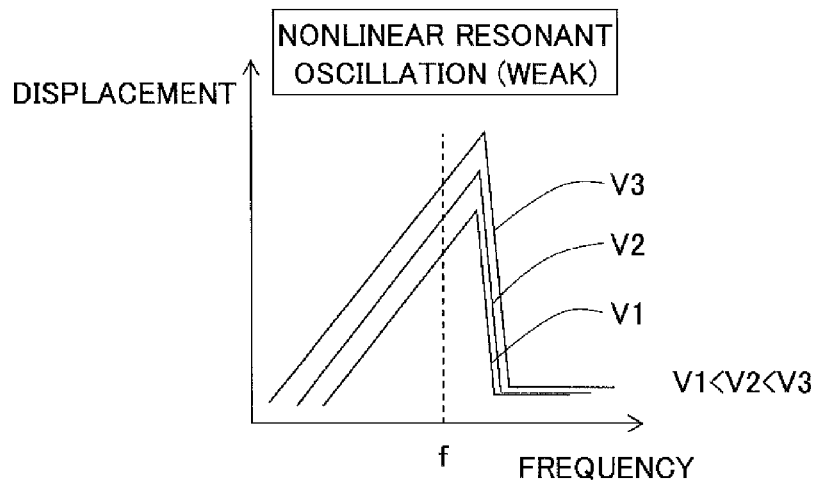
FIG. 7B is a view showing a displacement/frequency characteristic when a squareness ratio of a torsion beam divided by a slit is changed.
Figure 7C:
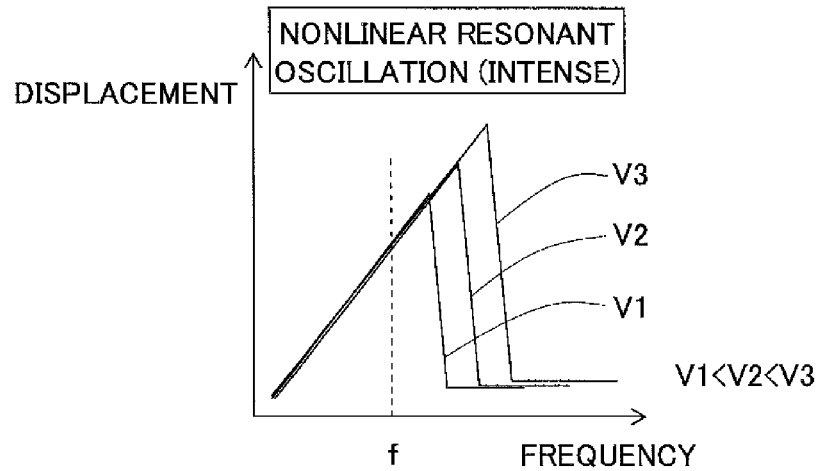
FIG. 7C is a view showing a displacement/frequency characteristic of an optical scanning device of a comparative example.

FIGS. 7A through 7C are views showing a displacement/frequency characteristic of the optical scanning device of the first example and the comparative example. FIG. 7A is a view showing the displacement/frequency characteristic of the optical scanning device of the first example. FIG. 7B shows a displacement/frequency characteristic when a squareness ratio of the torsion beams 30L, 30R divided by the slit 31 changes. FIG. 7C is a view showing the displacement/frequency characteristic of the optical scanning device of the comparative example.

As shown in FIG. 7A, the optical scanning device of the first example includes only minimal nonlinearity, and has a characteristic that can increase or decrease displacement by frequency f, depending on increase or decrease of a drive voltage. This makes it possible to increase or decrease an irradiation area of light by increasing or decreasing the drive voltage.

Here, as shown in FIG. 7B, even if the slit 31 is provided, when the squareness ratio is changed with respect to the right torsion beam 30R and the left torsion beam 30L of the slit 31, and a generated stress is eased up, the nonlinearity occurs. However, the nonlinearity weakens, and increasing or decreasing the displacement according to the drive voltage when frequency f is constant becomes possible.

Therefore, FIGS. 7A and 7B prove that by providing the slit 31 in the torsion beam 30, if the frequency is constant and the drive voltage is increased or decreased, increasing or decreasing the displacement is possible.

On the other hand, FIG. 7C proves that where the nonlinearity is intense, even if the frequency is made constant and the drive voltage is increased or decreased, the displacement does not change, and the size of the scanning area cannot be changed.

In this way, according to the optical scanning device of the first example, by providing the slit 31 approximately parallel to the axial direction in the center of the torsion beam 30, reducing the nonlinearity is possible. In this case, the slit 31 agrees with the rotation axis or the rocking axis.

Here, it is also possible to provide plural slits 31 in the torsion beam 30 symmetrically about the rotation axis. However, if the number of the slits 31 is increased to two, three and more symmetrically about the rotation axis, the nonlinearity further weakens, but the rigidity as the axis beam also weakens. In order to reinforce the rigidity, if many ribs 21 are provided on the back side of the mirror supporting part 20, in that case, the gravity center of the mirror moves downward from the rotation axis in a thickness direction, which generates a pendulum motion. Hence, if the number of the slits 31 is increased, the number of the slits 31 needs to be increased considering a balance with the rigidity. Here, even if the slit 31 is only a single slit, the pendulum motion itself occurs. However, because torsional rigidity of the torsion beam 30 is strong enough, even when the mirror 10 swings at a mirror inclination of ±12 degrees mechanical angle, a displacement amount of the pendulum motion is minute, and there is no problem.

(Displacement Expansion Structure by Stress Dispersion)

Figure 8A:
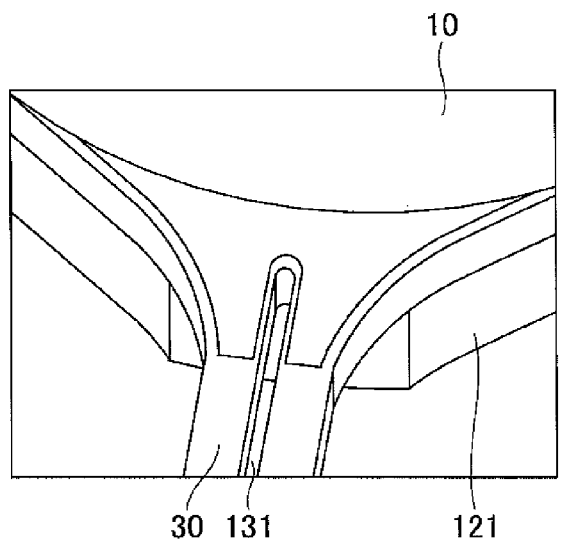
FIG. 8A is an enlarged view showing the upper side of a torsion beam when a short slit is provided in the torsion beam.
Figure 8B:
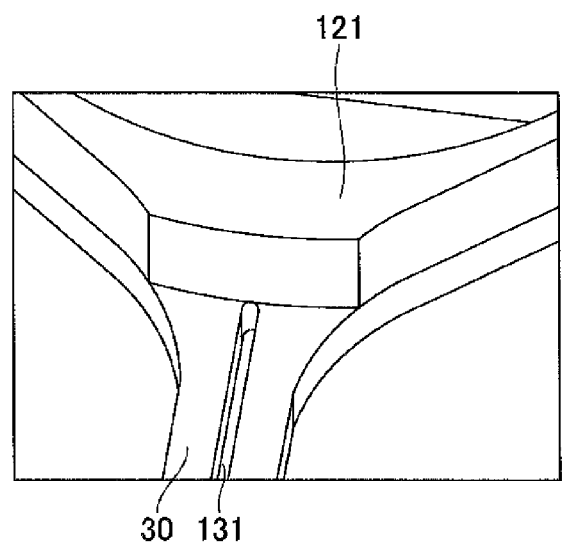
FIG. 8B is an enlarged view showing the back side of the torsion beam when the short slit is provided in the torsion beam.
Figure 8C:
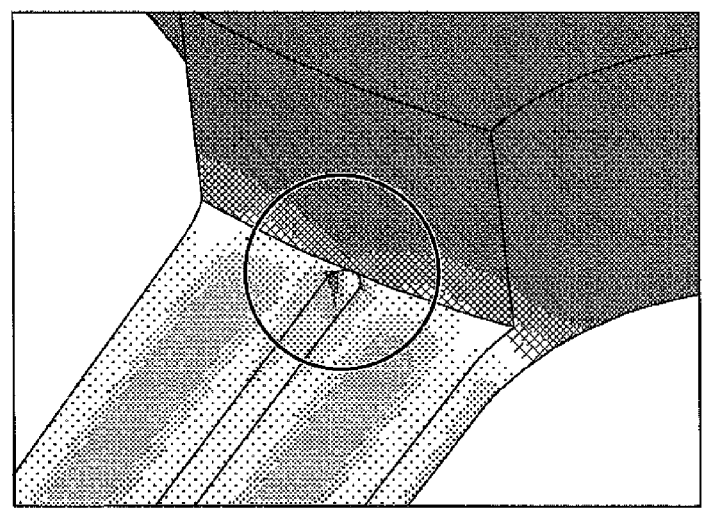
FIG. 8C is a stress distribution map showing the back side of the torsion beam when the short slit is provided in the torsion beam.

FIGS. 8A through 8C are views to illustrate points to be considered where the slit 31 is provided in the torsion beam 30 in the optical scanning device of the first embodiment for nonlinearity oscillation measures. FIG. 8A is an enlarged view of the upper side of the torsion beam 30 including a short slit 131. FIG. 8B is an enlarged view of the back side of the torsion beam 30 including the short slit 131. FIG. 8C is a view showing a stress distribution on the back side of the torsion beam 30 including the short slit 131.

FIGS. 8A and 8B show a case where an edge of the slit 131 provided in the torsion beam 30 contacts an edge face of a rib 121 provided on the back side of the mirror supporting part 20. In such a case, as shown in FIG. 8C, stress concentrates on the edge of the slit 131 and damage easily occurs, which causes a problem of not being able to incline the mirror 10 sufficiently. Such a phenomenon also occurs if the edge of the slit 131 does not reach the edge face of the rib 121.

Figure 9A:
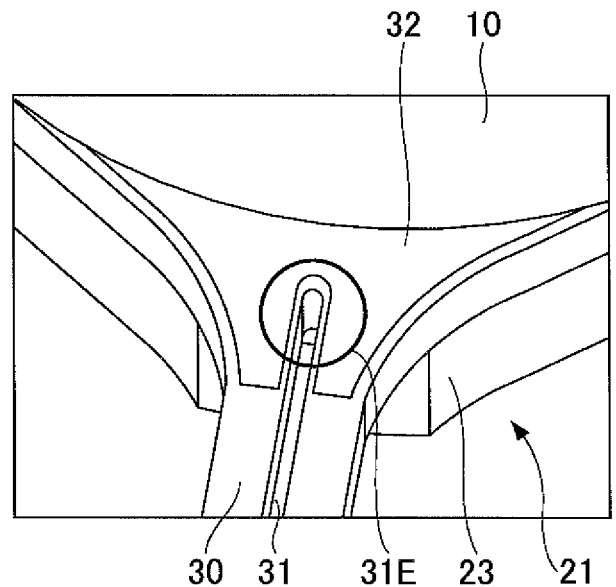
FIG. 9A is a configuration view showing the upper side of a connection between a mirror supporting part and a torsion beam of an optical scanning device of the first embodiment.
Figure 9B:
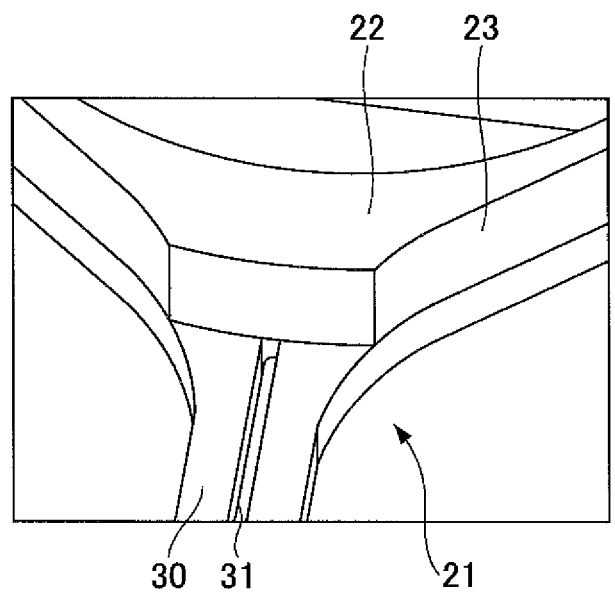
FIG. 9B is a configuration view showing the back side of the connection between the mirror supporting part and the torsion beam of the optical scanning device of the first embodiment.

FIGS. 9A and 9B are views showing an example of a configuration of a connection between the mirror supporting part 20 and the torsion beam 30 of the optical scanning device of the first embodiment. To prevent the generation of the stress concentration on the edge of the slit 31 illustrated in FIGS. 8A through 8C, the optical scanning device of the first embodiment adopts a configuration shown in FIGS. 9A and 9B.

FIG. 9A is a view showing an example of a configuration on the upper side of the connection between the mirror supporting part 20 and the torsion beam 30 of the optical scanning device of the first embodiment. FIG. 9B is a view showing an example of a configuration on the back side of the connection between the mirror supporting part 20 and the torsion beam 30 of the optical scanning device of the first embodiment.

In FIG. 9A, an edge 31E of the slit 31 provided in the torsion beam 30 cuts more inward than an outer edge of the rib 21 on the back side of the mirror supporting part 20, a part of the rib 21 is configured to be exposed from the slit 31. Thus, by reaching the edge 31E of the slit 31 more inward than the outer edge of the rib 21, the rib 21 reinforces the edge 31E of the slit 31, and can absorb and reduce the stress generated at the edge 31E of the slit 31.

In FIG. 9A, a thin film of a black resist 32 is formed between the mirror 10 and the torsion beam 30. The black resist 32 is formed to prevent light from being reflected from a space between the mirror 10 and the torsion beam 30 outside the mirror 10, if the light is irradiated in a range beyond the mirror 10. For example, the black resist 32 may be formed by application.

As shown in FIG. 9B, the slit 31 reaches inside of the rib 21 located in the connection between the mirror supporting part 20 and the torsion beam 30.

Figure 10:
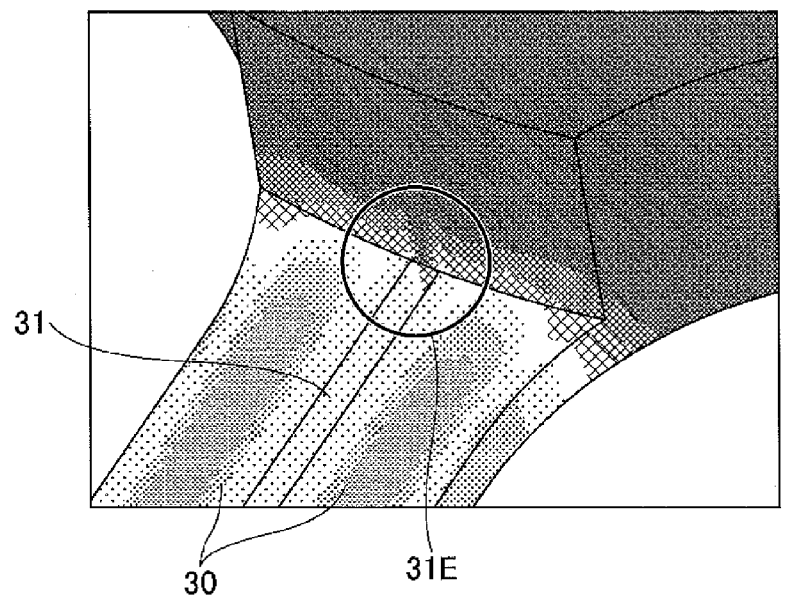
FIG. 10 is a map showing a stress distribution at an edge of the slit of the torsion beam in the optical scanning device of the first embodiment.

FIG. 10 is a view showing a stress distribution in the edge 31E of the slit 31 of the torsion beam 30 in the optical scanning device of the first embodiment. FIG. 10 shows that the stress generated at the edge 31E of the slit 31 does not concentrate on the edge 31E but disperses in the torsion beam 30. If FIG. 10 is compared to FIG. 8C, the difference is made clear.

In this way, by the edge of the slit 31 on the mirror supporting part 20 provided in the torsion beam 30 reaching more inward than the outside edge of the rib 21, and by making a configuration where the slit 31 cuts into the mirror 10 side, the stress generated at the slit edge 31E can be dispersed into an area other than the slit edge 31E, and inclining the mirror 10 in a large displacement becomes possible.

(Mirror Deformation Prevention Structure)

Figure 11A:
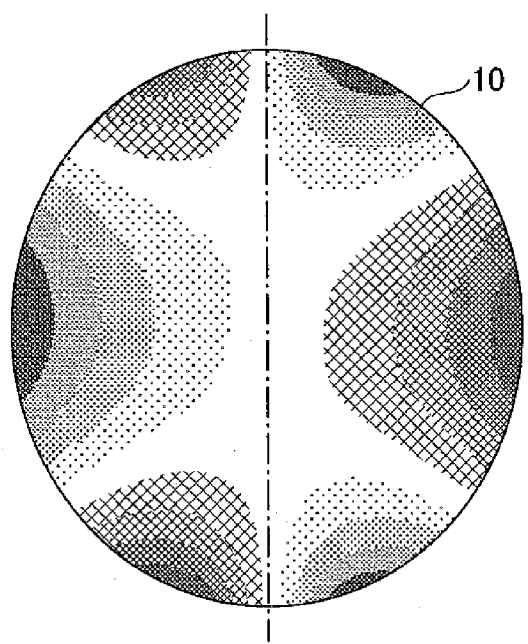
FIG. 11A is a view showing an example of a deformation distribution of a mirror of an optical scanning device having a configuration without a mirror deformation prevention structure.
Figure 11B:
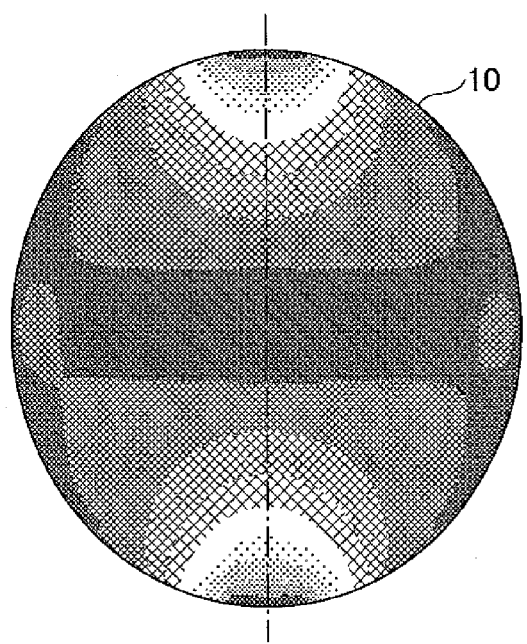
FIG. 11B is a view showing an example of a stress distribution of the mirror of the optical scanning device having the configuration without the mirror deformation prevention structure.

FIGS. 11A and 11B are views showing an example of mirror deformation and a stress distribution in an optical scanning device of a configuration without a mirror deformation prevention structure. FIG. 11A is a view showing an example of a deformation distribution of the mirror 10 of the optical scanning device of the configuration without the mirror deformation prevention structure. FIG. 11B is a view showing an example of a stress distribution of the mirror 10 of the optical scanning device of the configuration without the mirror deformation prevention structure.

In FIG. 11A, a vertical line passing through the center of the mirror 10 becomes a rocking axis. As shown in FIG. 11A, deformations in the farthest parts from the center on a diameter perpendicular to the rocking axis, and in parts symmetrical about the rocking axis between the farthest parts are large.

FIG. 11B is similar to FIG. 11A in that a vertical line passing through the center of the mirror 10 is a rocking axis. FIG. 11B shows that parts with high stress generated in the mirror 10 are connections with the torsion beams 30.

Figure 12:
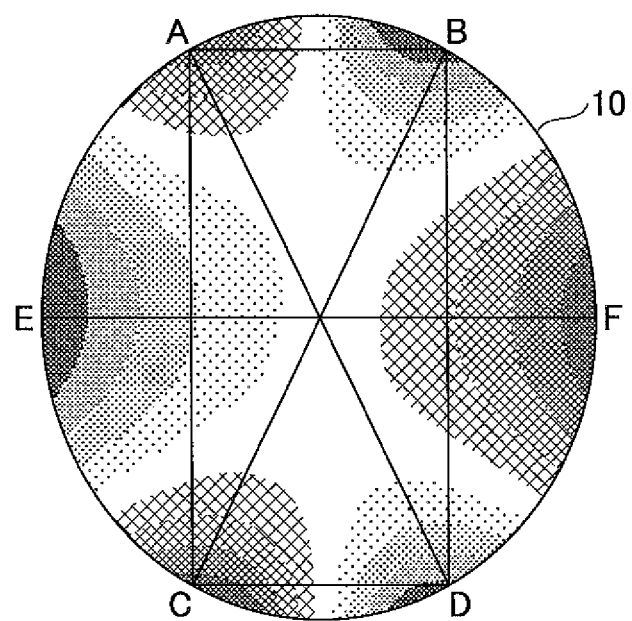
FIG. 12 is a view to illustrate a mirror deformation prevention structure of the optical scanning device of the first embodiment.

FIG. 12 illustrates a mirror deformation prevention structure of the optical scanning device of the first embodiment. In FIG. 12, parts with a large deformation of the mirror 10 are shown as A-F. In the optical scanning device of the first embodiment, by providing ribs 21 connecting such parts with the large mirror deformation to each other on the back side of the mirror supporting part 20, and by further providing ribs 21 on the connections of the border between the torsion beam 30 and the mirror supporting part 20, a maximum mirror deformation prevention effect is obtained with a minimum number of ribs.

Figure 13A:
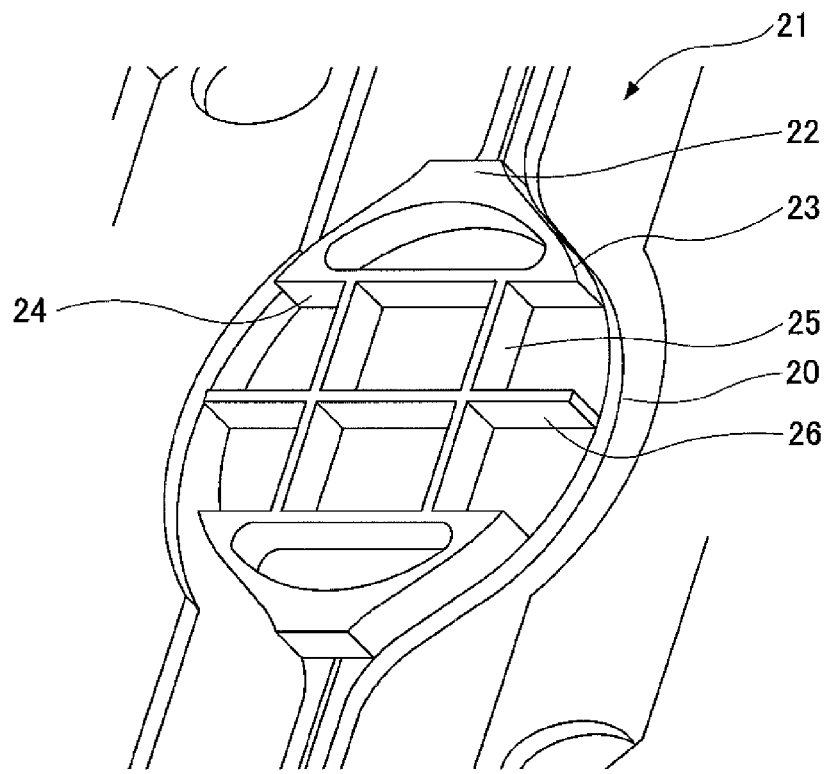
FIG. 13A is a perspective view showing a rib structure of the mirror supporting part of the optical scanning device of the first embodiment.
Figure 13B:
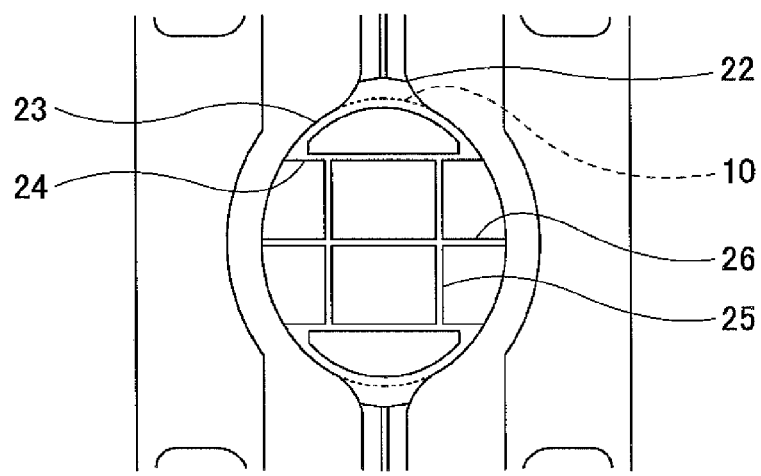
FIG. 13B is a plan view showing the rib structure of the mirror supporting part of the optical scanning device of the first embodiment.

FIGS. 13A and 13B are views showing a rib structure on the back side of the mirror supporting part 20 of the optical scanning device of the first embodiment. FIG. 13A is a perspective view showing a rib structure of the mirror supporting part 20 of the optical scanning device of the first embodiment. FIG. 13B is a plan view showing a rib structure of the mirror supporting part 20 of the optical scanning device of the first embodiment.

In FIGS. 13A and 13B, the ribs 21 are provided so as to connect the points A-F having high stress. More specifically, the rib structure includes the arc-like ribs 23 that respectively connect A with B, and C with D arcuately, chordal ribs 24 that connect the both edges of the arc-like ribs 23 to each other and reinforce the arc-like ribs 23, a transverse rib 26 that connects E with F in a direction perpendicular to the rocking axis, and longitudinal ribs 25 that connect A with C, and B with D in a direction parallel to the rocking axis. With such ribs 23-26, the deformation of the mirror 10 can be directly suppressed.

However, as shown in FIG. 11B, it is thought that the stress of the torsion beam 30 comes from the connection with the mirror supporting part 20 to the mirror 10, and acts on the mirror 10 so as to be deformed, so measures for the stress is needed. Therefore, in the optical scanning device of the present embodiment, connecting ribs 22 are also provided on the connection between the torsion beam 30 and the mirror supporting part 20. Furthermore, as shown in FIG. 13B, by projecting the connecting rib 22 farther toward the torsion beam 30 than is the edge of the mirror 10, a stress transmission from the torsion beam 30 is effectively blocked. Because such projecting parts of the connecting ribs 22 are near the rotation axis (or rocking axis), inertia does not increase, which is advantageous for a high speed drive.

Figure 14A:
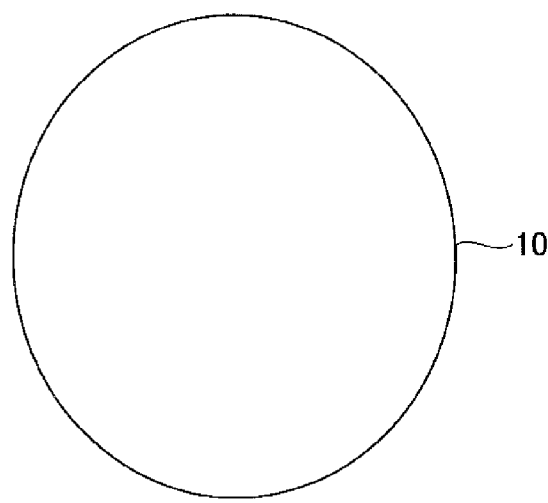
FIG. 14A is a view showing a mirror deformation amount of the optical scanning device of the first embodiment.
Figure 14B:
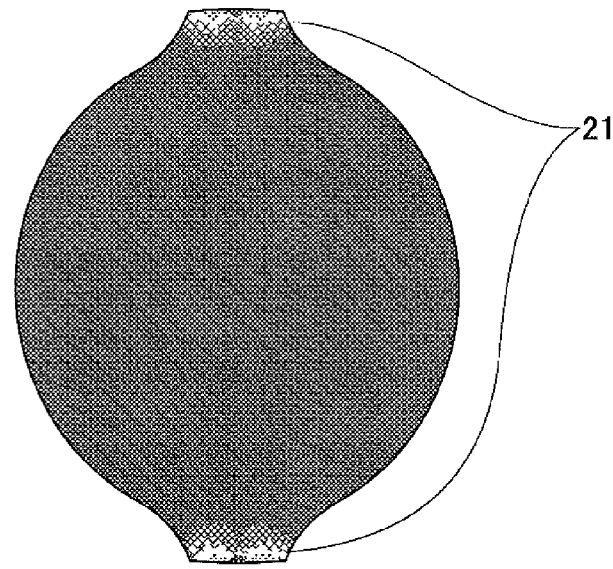
FIG. 14B is a view showing a stress distribution of the optical scanning device of the first embodiment including a projecting part of a connecting rib.
Figure 14C:
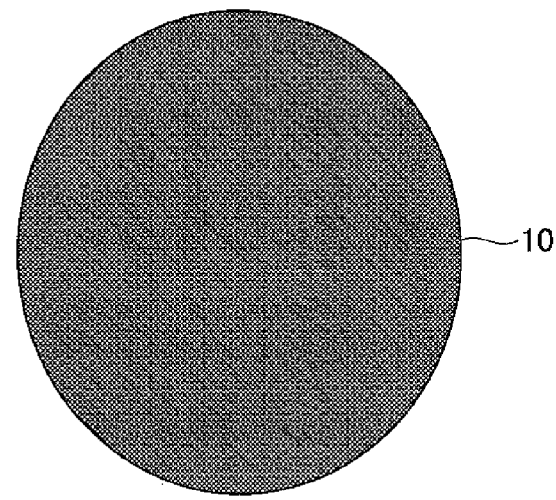
FIG. 14C is a view showing a stress distribution in a mirror plane.

FIGS. 14A through 14C are views showing an example of a mirror deformation amount and a stress distribution of the optical scanning device of the first embodiment. FIG. 14A is a view showing an example of the mirror deformation amount of the optical scanning device of the first embodiment. FIG. 14A proves that if the rib 21 is provided on the back side of the mirror supporting part 20 as the mirror deformation prevention structure, the deformation amount of the mirror 10 is almost zero, and the mirror 10 is sufficiently flat.

FIG. 14B is a view showing the stress distribution of the optical scanning device of the first embodiment, including the projecting part of the connecting rib 22. FIG. 14B proves that by projecting the ribs 21 (i.e., connecting ribs 22) toward the torsion beam 30 beyond the edge of the mirror 10, the stress concentrates on the projecting part, which becomes a stress relaxation part of the torsion beam 30.

FIG. 14C is a view showing a stress distribution in a mirror 10 plane. As shown in FIG. 14C, stress is only minimally generated in the mirror 10 plane. This is because the stress from the torsion beam 30 is absorbed in the projecting part of the connecting ribs 22, and is not transferred to the mirror 10.

Second Example

Figure 15A:
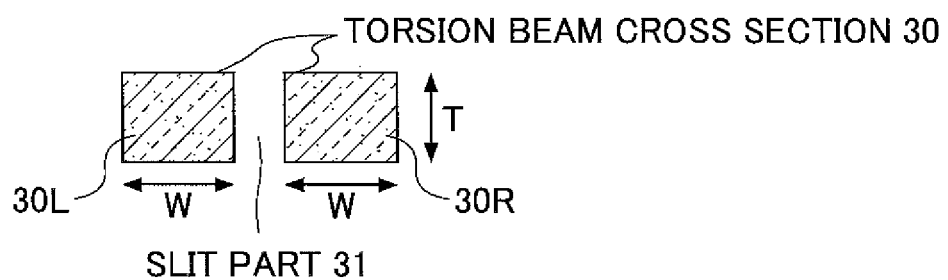
FIG. 15A is a cross-sectional configuration view of a torsion beam of an optical scanning device of a second embodiment.

FIGS. 15A through 15D are views showing a configuration and performance results of an optical scanning device of a second example. FIG. 15A is a view showing a cross-sectional configuration of a torsion beam 30 of the optical scanning device of the second example. As shown in FIG. 15A, a slit 31 is provided in the center of a torsion beam 30, and torsion beams 30L, 30R having a cross-sectional shape similar to a square on both sides of the slit 31. The left torsion beam 30L and the right torsion beam 30R have the same cross-sectional configuration, and the width is expressed as W, and the thickness is expressed as T.

Figure 15B:
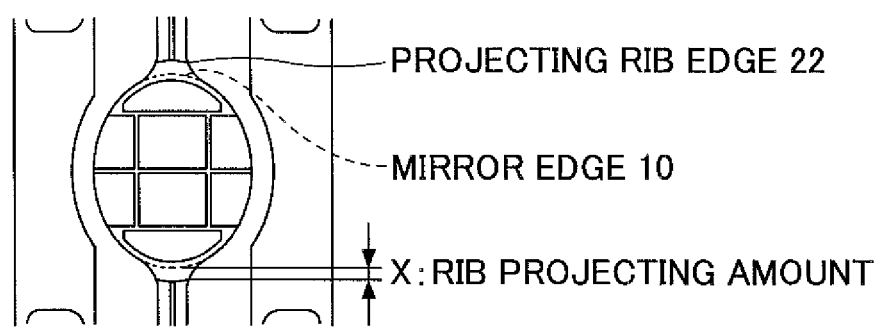
FIG. 15B is a plane configuration view of the back side of the optical scanning device of the second embodiment.

FIG. 15B is a view showing a plane configuration on the back side of the optical scanning device of the second example. As shown in FIG. 15B, the optical scanning device of the second example has a configuration similar to the optical scanning device of the first embodiment described in FIGS. 13A and 13B. Specifically, the optical scanning device of the second example includes connecting ribs 22 that project toward the torsion beam 30 more than does the circumference of the mirror 10, and a projecting amount of the connecting rib 22 from the mirror 10 is expressed as X mm.

Figure 15C:
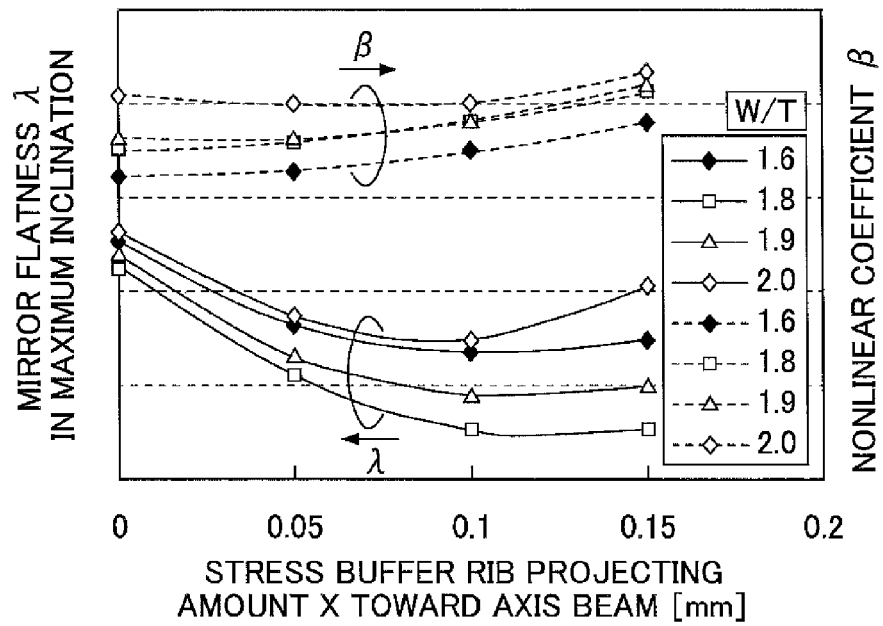
FIGS. 15C and 15D are views showing the relationship among a projecting amount X of a connecting rib, a mirror flatness λ in a maximum inclination and a nonlinear coefficient β.

FIG. 15C is a view showing the relationship between a mirror flatness λ in the maximum inclination and a nonlinearity coefficient β. In FIG. 15C, W means a width of one side of a torsion beam; T means a torsion beam thickness; W/T means a squareness ratio of one side of the torsion beam; X means a rib projecting amount; λ means a mirror flatness in the maximum inclination; and β means a nonlinearity coefficient. Moreover, characteristics shown by solid lines express the mirror flatness λ, and characteristics shown by broken lines express the nonlinearity coefficient β.

In the characteristics shown by the broken lines in FIG. 15C, as the squareness W/T of the torsion beam is small and close to one (i.e., close to a square), and as the projecting amount X mm decreases, the nonlinearity coefficient β decreases. However, values of the nonlinearity coefficient β change are relatively small, even though the rib projecting amount X changes.

On the other hand, in the characteristics shown by the solid lines in FIG. 15C, the mirror flatness λ takes local minimum values around W/T=1.8, X=0.1 mm. At X=0.1 mm, the nonlinearity coefficient β does not exactly have the optimal values, but as mentioned above, because changes of the nonlinearity coefficient β are not so large and a configuration that projects the ribs 21 aims at the mirror deformation prevention, W/T=1.8, X=0.1 mm are made the optimal values.

Figure 15D:
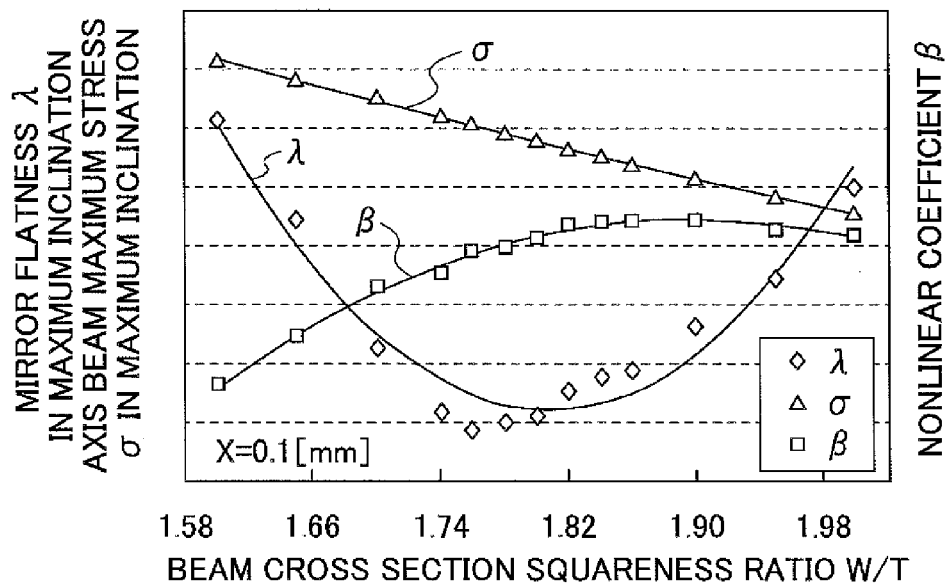

FIG. 15D is a view showing the relationship among the squareness W/T of the torsion beam 30, the mirror flatness λ in the maximum inclination, an axis beam maximum stress σ in the maximum inclination, and the nonlinearity coefficient β. In FIG. 15D, from the results of FIG. 15C, the projecting amount X is fixed at X=0.1 mm. Then, changes in the mirror flatness λ in the maximum inclination, the axis beam maximum stress σ in the maximum inclination, and the nonlinearity coefficient β are measured, changing the squareness W/T of both sides 30R, 30L of the torsion beam 30.

As shown in FIG. 15D, the nonlinearity coefficient β decreases as the squareness W/T decreases and approaches one (i.e., as approaching a square). The results can be said to be natural because bringing both of the sides 30R, 30L of the torsion beam 30 close to a square is fundamentally performed for the nonlinearity measures.

On the other hand, the mirror flatness λ in the maximum inclination takes the minimum value at W/T=1.76. In addition, though the axis beam maximum stress σ in the maximum inclination decreases as W/T increases, there is no problem as long as the maximum stress σ is not more than an allowable stress of the torsion beam 30. The axis beam maximum stresses σ in the maximum inclination shown in FIG. 15D are all values without any problems.

From FIG. 15C, an optimal range of the rib projecting amount X is 0.05≤X≤0.15 mm, and X=0.1 mm is the optimal value.

Also, from the characteristics of the axis beam maximum stress σ in the maximum inclination and the nonlinearity coefficient β shown in FIG. 15D, the optimal range of W/T is 1.7≤W/T≤1.9, and the optimal value is W/T=1.76.

In this way, by adjusting the rib projecting amount X and W/T of both sides 30R, 30L of the torsion beam 30, the maximum stress σ applied to the torsion beam 30 is made a magnitude without a problem, and the mirror flatness λ and the nonlinearity coefficient β can be reduced.

(Crosstalk Prevention Structure to Vertical Driving Beam in Horizontal Driving)

Figure 16A:
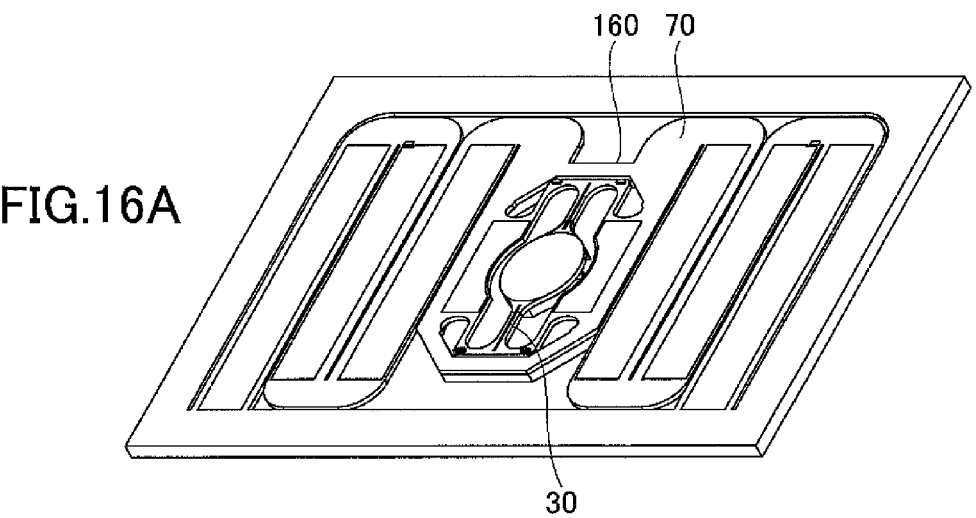
FIG. 16A is a perspective view showing a configuration on the upper side of an optical scanning device using a movable frame and not including a rib on the back side.
Figure 16B:
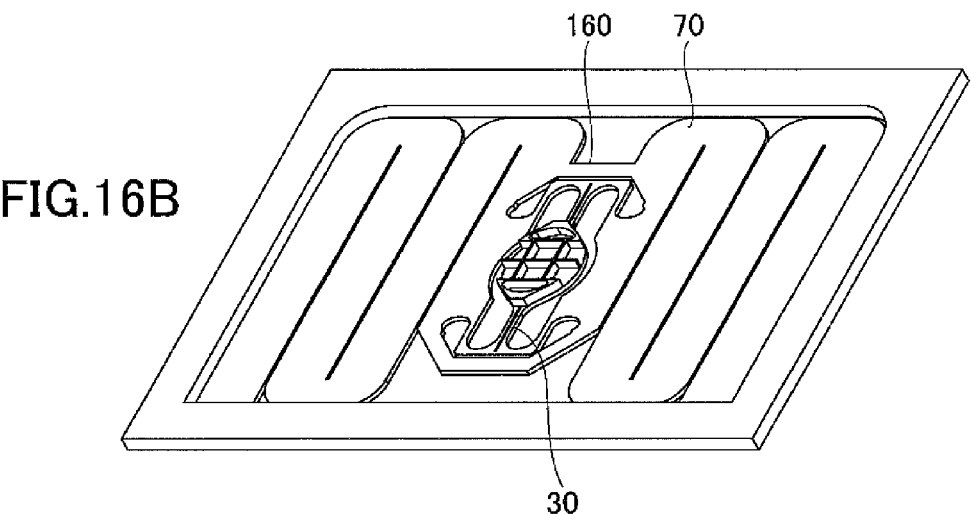
FIG. 16B is a view showing a configuration on the back side of the optical scanning device using the movable frame and not including the rib on the back side.
Figure 16C:
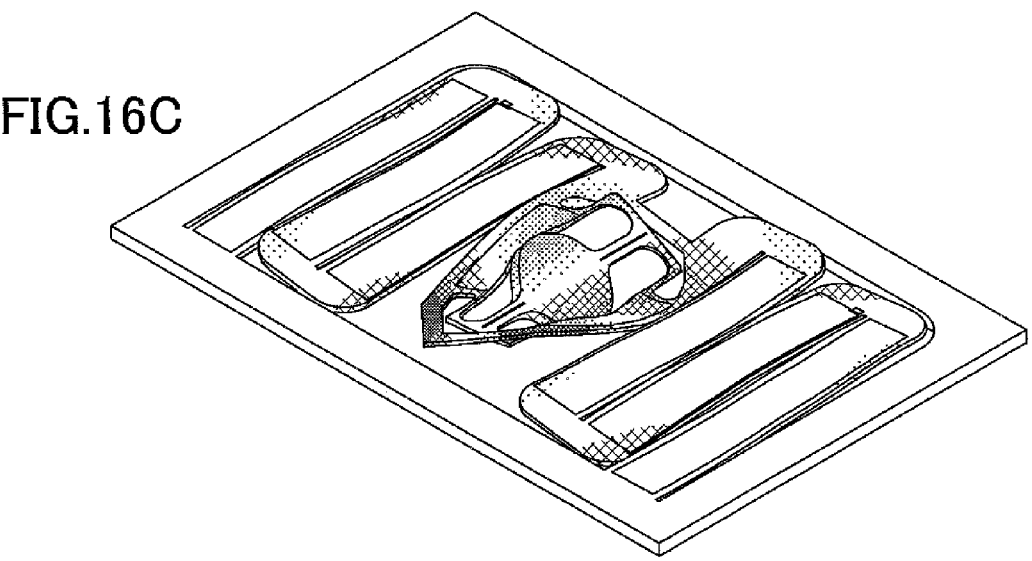
FIG. 16C is a view showing a horizontal driving state of the optical scanning device using the movable frame and not including the rib on the back side.

FIG. 16A through 16C are views to illustrate crosstalk generated if there is a movable frame 60 without a rib on the back side in the optical scanning device of the first embodiment. FIG. 16A is a perspective view showing a configuration on the upper side of an optical scanning device using a movable frame 60 without a rib on the back side. FIG. 16B is a view showing a configuration on the back side of the optical scanning device using the movable frame 160 without the rib on the back side. FIG. 16C is a view showing a horizontal driving state of the optical scanning device using the movable frame 160 without the rib on the back side.

As shown in FIGS. 16A and 16B, if the optical scanning device is configured by using the movable frame 160 without the rib, the movable frame 160 is configured as a beam with the same thickness as the other beams.

As shown in FIG. 16C, if the optical scanning device is configured by using the movable frame 160 without the rib, the second drive beams 70 that are vertical drive beams largely deform by horizontal driving by the torsion beams 30. In other words, so-called crosstalk that affects the vertical driving when the horizontal driving occurs.

Figure 17A:
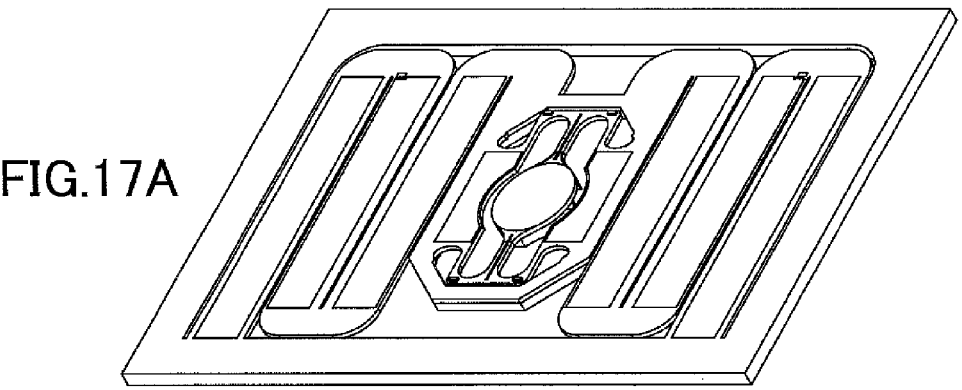
FIG. 17A is a perspective view showing a configuration on the upper side of an optical scanning device using a movable frame and including a rib on the back side.
Figure 17B:
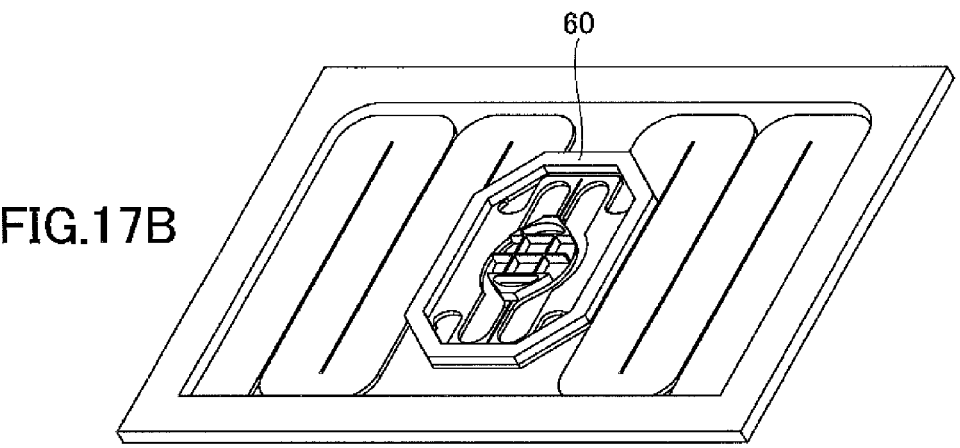
FIG. 17B is a view showing a configuration on the back side of the optical scanning device using the movable frame and including the rib on the back side.
Figure 17C:
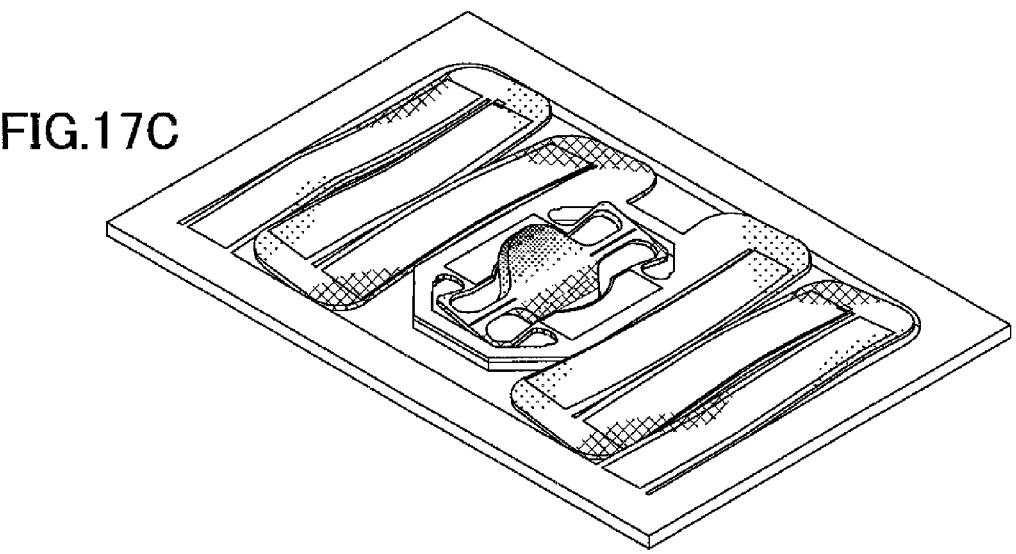
FIG. 17C is a view showing a horizontal driving state of the optical scanning device using the movable frame and including the rib on the back side.

FIGS. 17A through 17C are views to illustrate crosstalk that is generated even if a movable frame 60 including a rib on the back side is used. FIG. 17A is a perspective view showing a configuration on the upper side of the optical scanning device using the movable frame 60 with the rib on the back side. FIG. 17B is a perspective view showing a configuration on the back side of the optical scanning device using the movable frame 60 with the rib on the back side. FIG. 17C is a view showing a horizontal drive state of the optical scanning device using the movable frame 60 with the rib on the back side.

As shown in FIGS. 17A and 17B, by using the movable frame 60 including a rib on the back side, the movable frame 60 has a degree of thickness, and is configured as a frame with high rigidity.

However, as shown in FIG. 17C, when the optical scanning device is driven horizontally by using the first drive beams 50, the second drive beams 70 that are a vertical drive beams still deform.

Figure 18A:
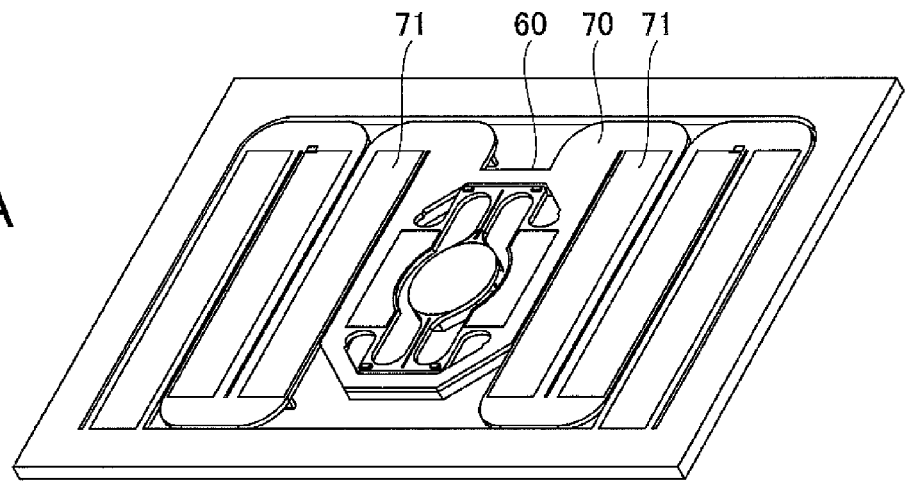
FIG. 18A is a perspective view showing a configuration on the upper side of the optical scanning device of the first embodiment.
Figure 18B:
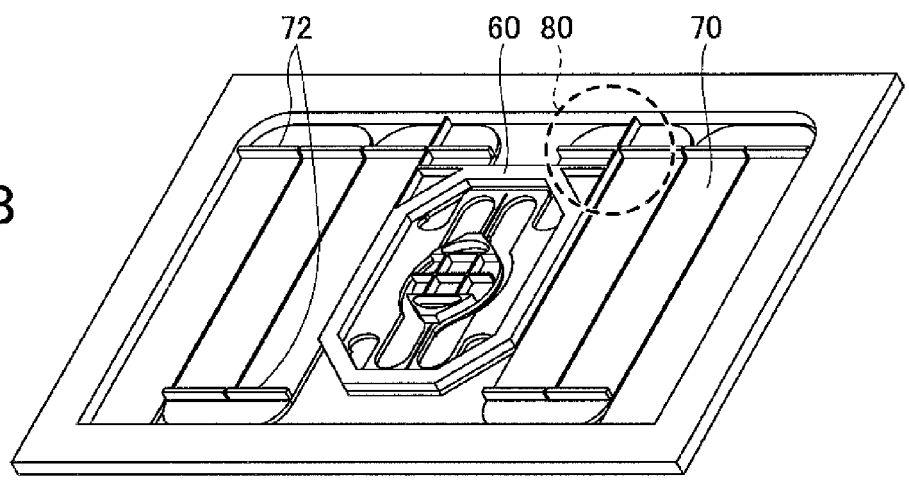
FIG. 18B is a perspective view showing a configuration on the back side of the optical scanning device of the first embodiment.
Figure 18C:
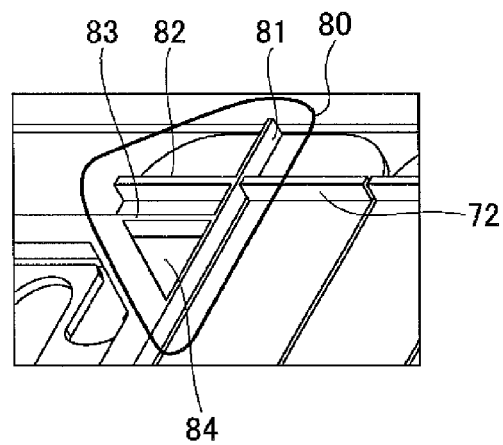
FIG. 18C is an enlarged view showing a crosstalk prevention structure of the optical scanning device of the first embodiment.

FIGS. 18A through 18C are views to illustrate a crosstalk prevention structure to the vertical drive beams during the horizontal drive of the optical scanning device of the first embodiment. FIG. 18A is a perspective view showing a configuration on the upper side of the optical scanning device of the first embodiment. FIG. 18B is a perspective view showing a configuration on the back side of the optical scanning device of the first embodiment. FIG. 18C is an enlarged view showing the crosstalk prevention structure of the optical scanning device of the first embodiment.

As shown in FIG. 18A, the crosstalk prevention structure is not provided on the upper side of the optical scanning device.

On the other hand, as shown in FIG. 18B, on the back side of the optical scanning device of the first embodiment, a movable frame 60 including a rib is provided, and plural crosstalk preventing ribs 81-83 are provided on a connection 80 between the second drive beam 70 and the movable frame 60. Here, in FIG. 18B, the second drive beams 70 include ribs 72 in places other than the connection 80 with the movable frame. The ribs 72 are for harmonic superposition prevention when the optical scanning device is driven in a vertical direction, and differ from the ribs for the crosstalk prevention. For example, when the second drive beams 70 are driven at 60 Hz, sometimes the harmonics of multiple numbers of 60 Hz such as 120 Hz, 240 Hz, 360 Hz and the like are superimposed. The ribs 72 for harmonic superposition prevention are provided to prevent such superposition of the harmonics.

As shown in FIG. 18C, the connection 80 between the movable frame 60 and the second drive beam 70 includes plural crosstalk preventing ribs 81-83 that extend in an axial direction of the horizontal drive and in a direction perpendicular to the axial direction. The crosstalk preventing rib 81 is a rib that extends continuously from the movable frame 60 parallel to the torsion beams 30 and the second drive beams 70. Moreover, the crosstalk preventing rib 82 is provided extending in a width direction of the second drive beams 70, symmetrically with the harmonic superposition preventing rib 72. The crosstalk preventing rib 83 is provided extending continuously from the movable frame 60 parallel to the crosstalk rib 82. Furthermore, the crosstalk preventing ribs 81, 83 are configured to form a triangular hollow 84 outside the movable frame 60.

In this manner, by providing the crosstalk preventing ribs 81-83 between the edge of the second drive beam 70 that is the vertical drive beam and the movable frame 60, a transmission of the oscillation in the horizontal drive to the second drive beams 70 can be prevented. In particular, by forming a triangle with the rib 81 and rib 83, the triangular hollow 84 can absorb stress generated by the horizontal drive, and reducing the influence on the second drive beams 70 of the vertical drive beam is possible.

Figure 19:
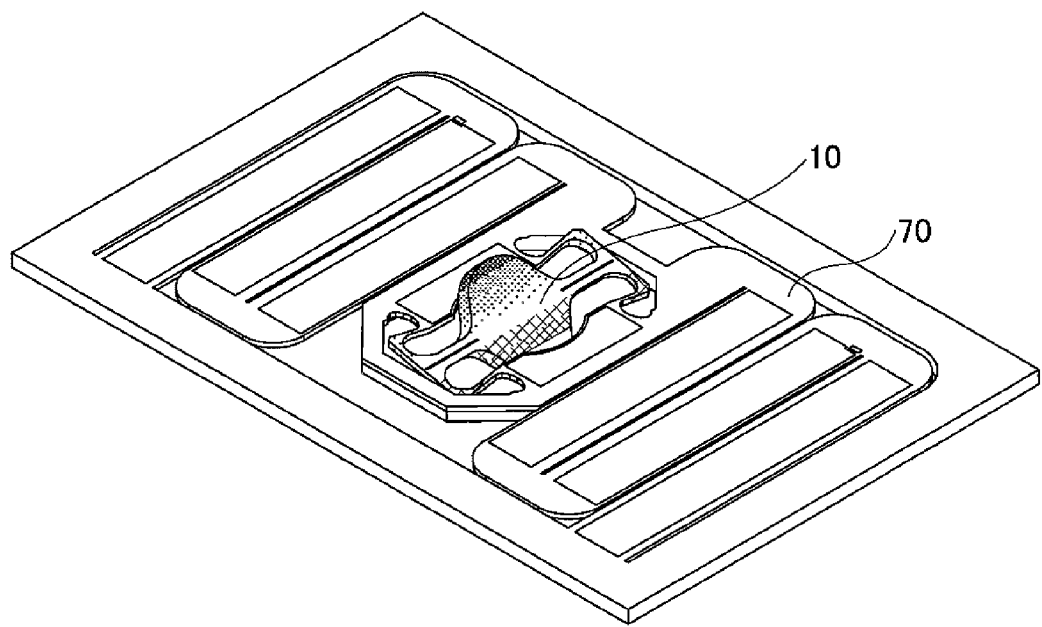
FIG. 19 is a stress distribution map in horizontal driving of the optical scanning device of the first embodiment.

FIG. 19 is a view showing a stress distribution during the horizontal driving of the optical scanning device of the first embodiment including the crosstalk preventing ribs 81-83. As shown in FIG. 19, stress acts on the mirror 10 driving horizontally, but stress does not occur in the second drive beams 70 of the vertical drive beam. Thus, by providing the crosstalk preventing ribs 81-83 between the vertical drive beam edge and the movable frame 60, transmission of the swinging oscillation in the horizontal resonant drive to the vertical drive beams can be blocked.

(Frequency Change Prevention Structure)

Figure 20A:
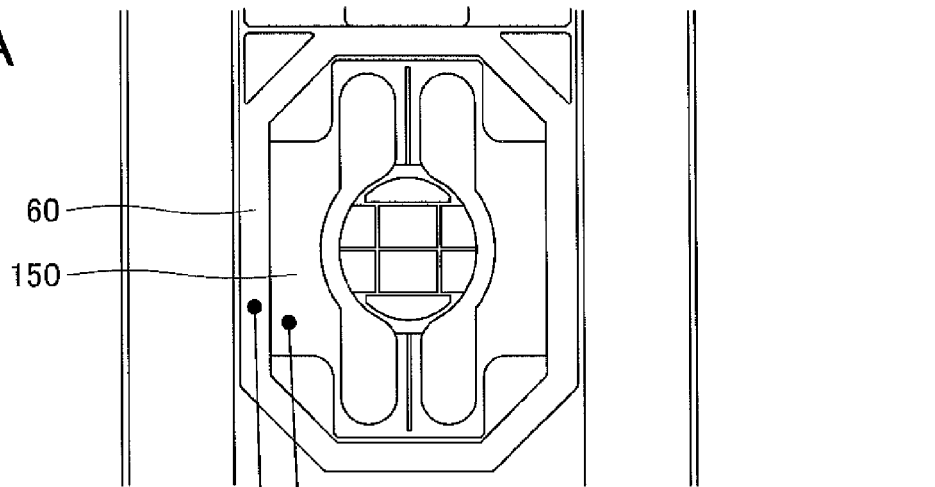
FIG. 20A is a plan configuration view showing an optical scanning device without a frequency change prevention structure.

FIGS. 20A through 20D are views to illustrate a frequency change caused by driving an optical scanning device without a frequency change prevention structure, though similar to the optical scanning device of the first embodiment. FIG. 20A is a view showing a plane configuration of the optical scanning device without the frequency change prevention structure. In FIG. 20A, the optical scanning device without the frequency change prevention structure has a shape in which resonant drive beams 150 in a horizontal direction extend from an inside wall of the movable frame 60. The resonant drive beam 150 extends vertically at a length L from the inside wall.

Figure 20B:
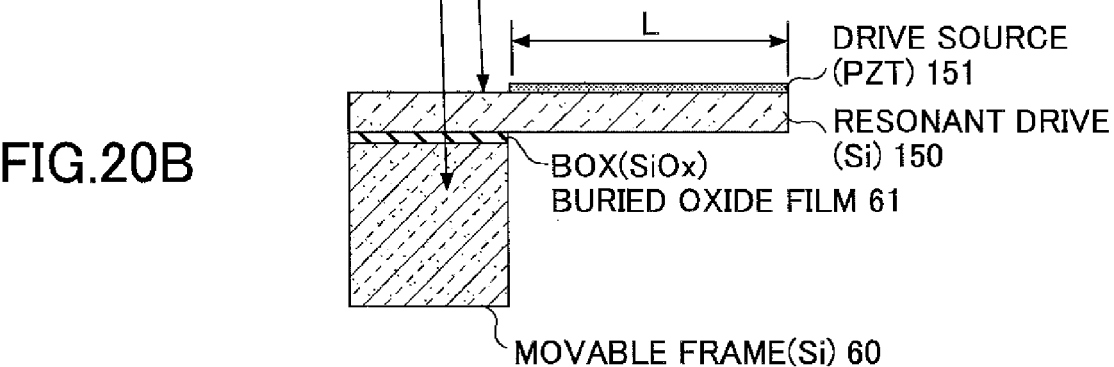
FIG. 20B is a cross-sectional configuration view of a movable frame and a resonant drive beam of the optical scanning device without the frequency change prevention structure shown in FIG. 20A.

FIG. 20B is a view showing a cross-sectional configuration of the movable frame 60 and the resonant drive beam 150 without the frequency change prevention structure shown in FIG. 20A. As shown in FIG. 20B, the movable frame 60 is made up of a whole SOI substrate including a thick silicon substrate, and the resonant drive beam 150 is made up of a thin silicon substrate via a buried oxide film 61. In addition, the resonant drive beam 150 includes a drive source composed of a thin film of a piezoelectric device on the surface. In this way, a part including a rib such as the movable frame 60 is made up of the whole SOI substrate composed by laminating the thick silicon substrate on the back side, the oxide film, and the thin silicon substrate on the upper side. On the other hand, a part constructing a beam such as the resonant drive beam 150 is made up of only the thin silicon substrate on the upper side. In this respect, the optical scanning device of the first embodiment is similar.

Figure 20C:
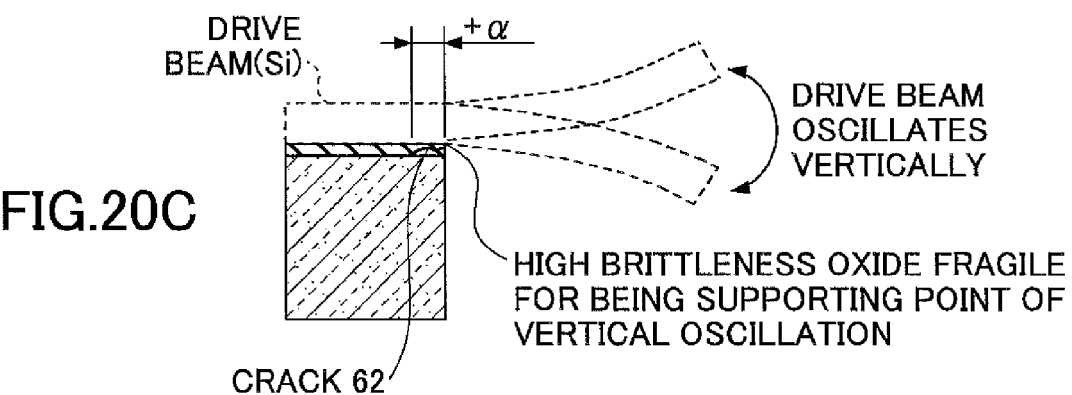
FIG. 20C is a view showing a drive state of the resonant drive beam.

FIG. 20C is a view showing a state of driving the resonant drive beam 150. The drive source 151 repeats expansion and contraction depending on the polarity of the drive voltage, by which the resonant drive beam 150 oscillates up and down. At this time, because the buried oxide film 61 sandwiched by the resonant drive beam 150 and the movable frame 60 becomes a supporting point of the up and down drive, and the buried oxide film 61 is a member like a glass with few elasticity, the buried oxide film 61 has a high brittleness and is easily damaged. Accordingly, sometimes a crack 62 occurs by the up and down driving of the resonant drive beam 150, and the oxide film 61 is damaged.

Figure 20D:
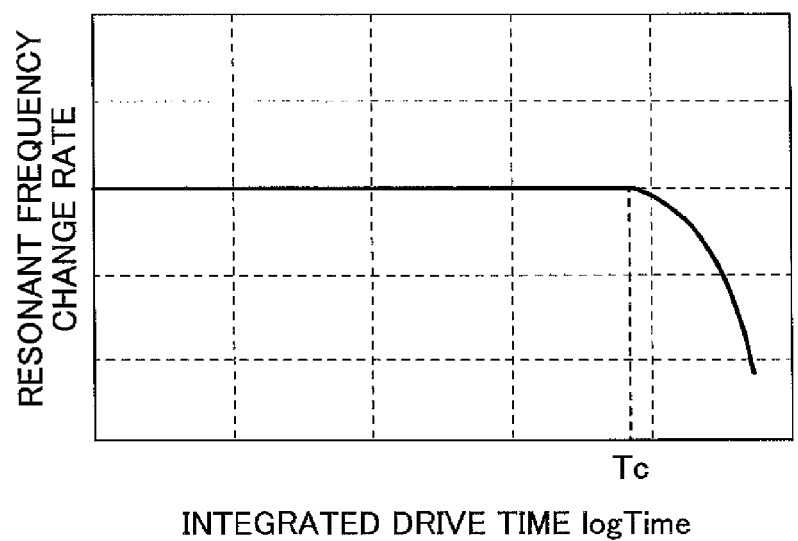
FIG. 20D is a view showing the relationship between an integrated drive time of the resonant drive beam and a resonant frequency change rate.

FIG. 20D is a graph showing an example of the relationship between an integrated drive time of the resonant drive beam 150 and a resonant frequency change rate. As shown in FIG. 20D, if the resonant drive beam 150 is continuously driven, the crack 62 occurs at the supporting point of the oxide film 61 at a certain time Tc, and an apparent length L of the resonant drive beam 150 increases to (L+α), which causes the frequency to shift lower and to change.

Figure 21A:
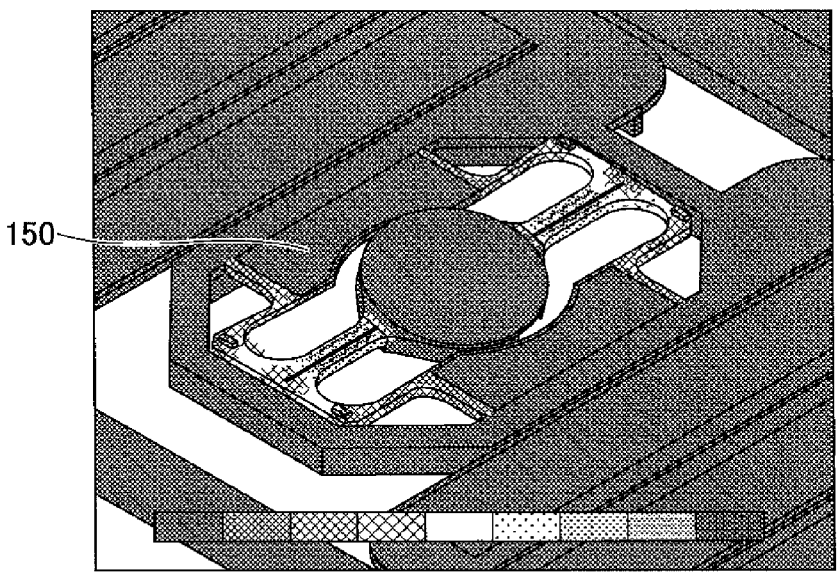
FIG. 21A is a stress distribution map on the upper side in a horizontal driving of an optical scanning device without a frequency change prevention structure.
Figure 21B:
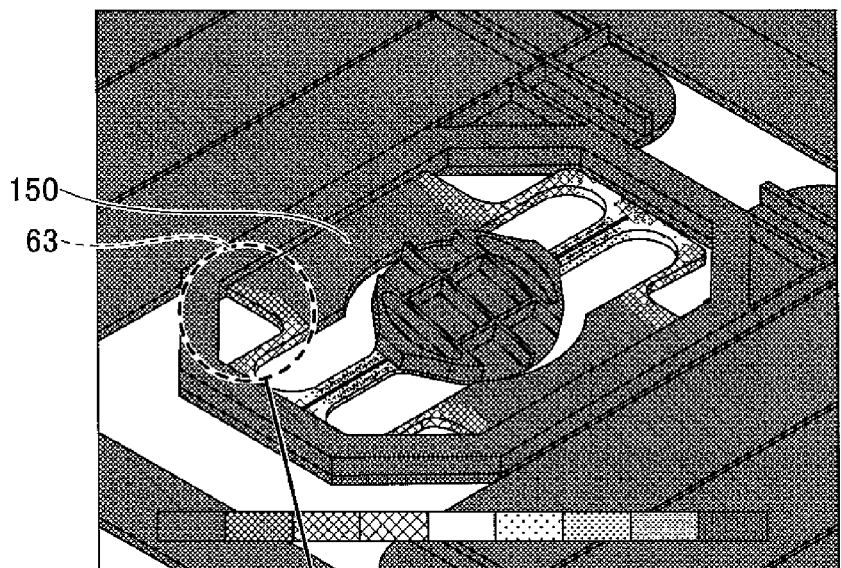
FIG. 21B is a stress distribution map on the back side in the horizontal driving of the optical scanning device without the frequency change prevention structure.
Figure 21C:
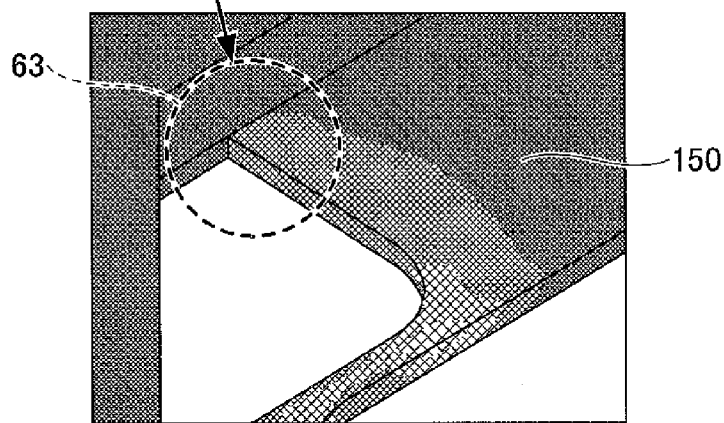
FIG. 21C is an enlarged view showing a supporting part of a drive beam of a stress distribution on the back side in the horizontal driving of the optical scanning device without the frequency change prevention structure.

FIGS. 21A through 21C are views showing a stress distribution of an optical scanning device without a frequency change prevention structure during the horizontal driving. FIG. 21A is a view showing a stress distribution on the upper side of the optical scanning device without the frequency change prevention structure in the horizontal driving. FIG. 21B is a view showing a stress distribution on the back side of the optical scanning device without the frequency change prevention structure in the horizontal driving. FIG. 21C is an enlarged view showing a stress distribution of a supporting point part of the drive beam on the back side of the optical scanning device without the frequency change prevention structure in the horizontal driving.

As shown in FIGS. 21A and 21B, the resonant drive beams 150 are coupled to the movable frame 60 in a state of extending vertically from the movable frame 60. Also, FIG. 21C proves that stress is in a state easily occurring in a root part 63 that becomes a supporting point of the resonant drive beams 150.

Figure 22A:
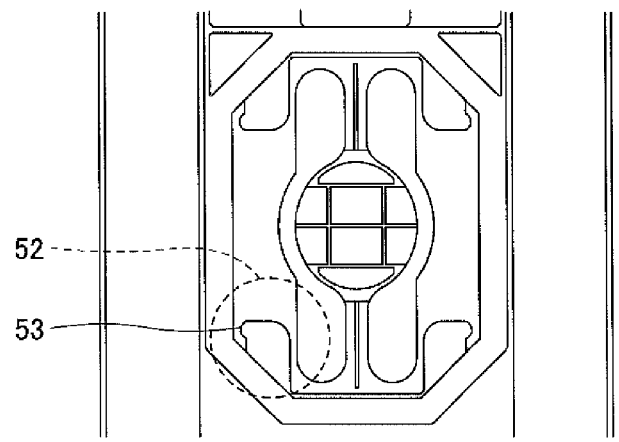
FIG. 22A is a plane configuration view of an optical scanning device with a first frequency change prevention structure.
Figure 22B:
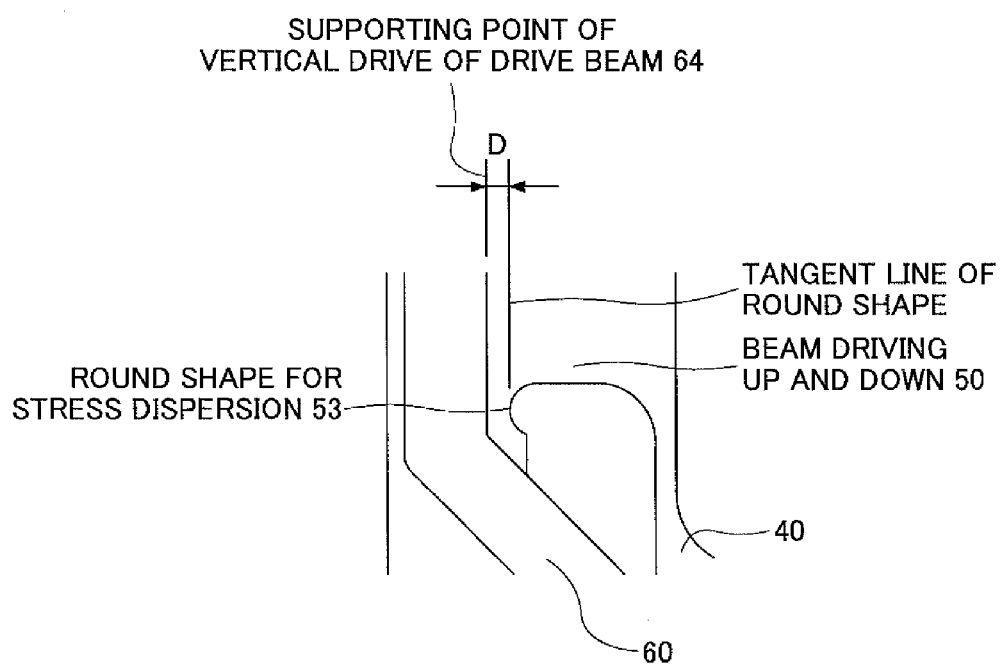
FIG. 22B is an enlarged view showing a root part shown in FIG. 22A.

FIGS. 22A and 22B are views to illustrate a first frequency change prevention structure of an optical scanning device of the first embodiment. FIG. 22A is a view showing a plane configuration of an optical scanning device of the present embodiment including a frequency change prevention structure. In FIG. 22A, a root part 52 connecting with the movable frame 60 of the first drive beam 50 is not connected to the inside wall of the movable frame 60 vertically; a curved shape part 53 having a rounded structure short of the movable frame 60 is formed; and the root part 52 is coupled to the movable frame 60 via the curved shape part 53. In other words, a plane configuration of the first drive beam 50 has the curved shape part 53 that is cut inward at a position near the movable frame 60 but not reaching the movable frame 60 in a side connecting the movable frame 60 with the coupling beam 40.

FIG. 22B is an enlarged view showing the root part 52 shown in FIG. 22A. In FIG. 22B, the curved shape part 53 that is cut inward is formed at a distance D from the supporting point 64 that is a border between the movable frame 60 and the first drive beam 50. Because the curved shape part 53 has an effect of dispersing and relaxing stress, by forming the curved shape part 53 more inward than the supporting point 64 of the movable frame 60, the stress that concentrates on a supporting point 64 (see FIG. 23C) can be dispersed to the curved shape part 53. This makes it possible to protect a part of the oxide film 61 of the movable frame 60, and to make the part of the oxide film 61 difficult to be damaged even if driven continuously.

Figure 23A:
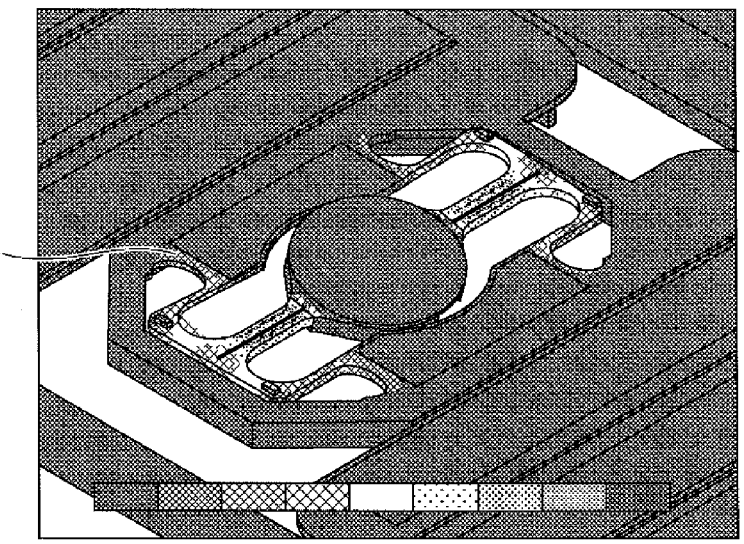
FIG. 23A is a stress distribution map on the upper side of a first drive beam of an optical scanning device of a first embodiment including a first frequency change prevention structure in a horizontal driving.
Figure 23B:
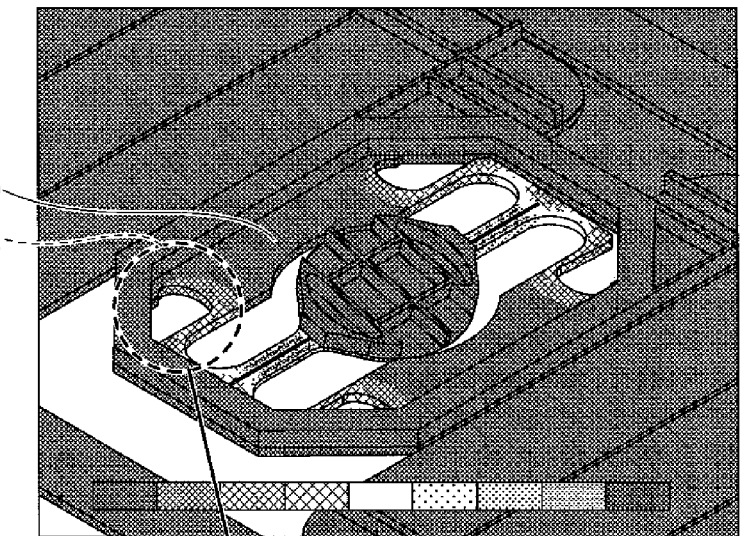
FIG. 23B is a stress distribution map on the back side of the first drive beam of the optical scanning device of the first embodiment including the first frequency change prevention structure in a horizontal driving.
Figure 23C:
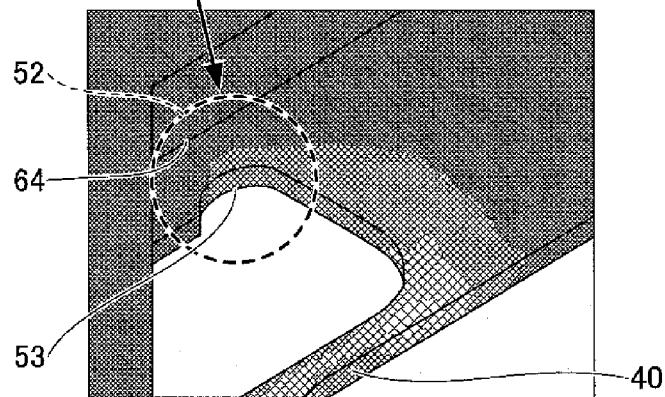
FIG. 23C is an enlarged view of a root part of the first drive beam shown in FIG. 23B.

FIGS. 23A through 23C are views showing a stress distribution in the horizontal drive of the optical scanning device of the first embodiment including the first frequency change prevention structure. FIG. 23A is a view showing the stress distribution on the upper side of the first drive beam 50 in the horizontal drive of the optical scanning device of the first embodiment. FIG. 23B is a view showing the stress distribution on the back side of the first drive beam 50 in the horizontal drive of the optical scanning device of the first embodiment. In FIGS. 23A and 23B, the curved shape part 53 is formed in the root part 52 of the first drive beam 50.

FIG. 23C is an enlarged view showing the root part 52 of the first drive beam 50 shown in FIG. 23B. In FIG. 23C, the curved shape part 53 is formed at a position more inside than the supporting point 64 and closer to the movable frame 60 than to the coupling beam 40. The stress distribution occurs in an area more inside than the curved shape part 53, and does not reach the part of the supporting point, as shown in FIG. 23C. Here, if a distance D between the supporting point 64 and the closest position to the supporting point 64 of the curved shape part 53 is so short that a generated stress cannot be separated from the supporting point of the up and down driving, but so long as swinging sensitivity decreases, there may be caused a concern of not being capable of meeting a required specification. Therefore, the distance D needs to be set at a proper value, for example, which may be set at 0.1 mm.

Figure 24:
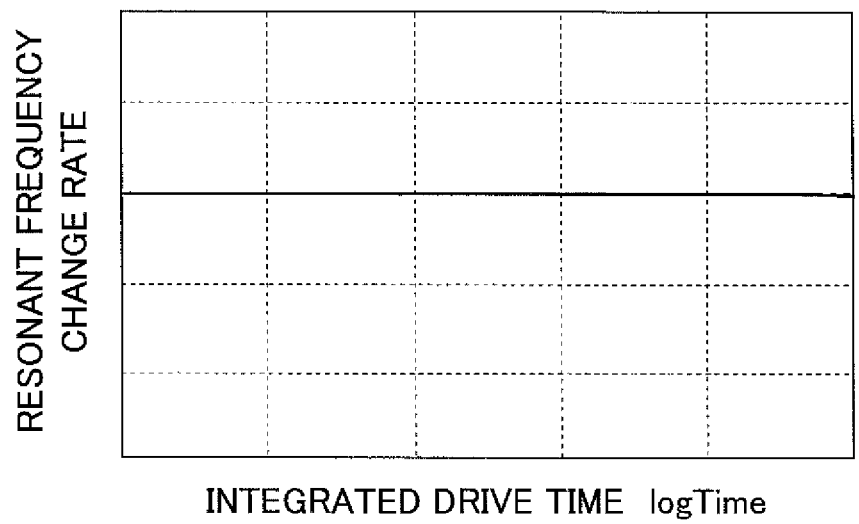
FIG. 24 is a view showing the relationship between an integrated drive time and a resonant frequency change rate caused by a resonant drive of the optical scanning device of the first embodiment.

FIG. 24 is a view showing an integrated drive time and a resonant frequency change rate of the optical scanning device of the first embodiment. FIG. 24, different from the example of FIG. 20D, shows that even though the integrated drive time becomes long, the resonant frequency change rate is constant, and the resonant frequency is kept constant.

Thus, according to the optical scanning device of the first embodiment, with respect to a planar shape of the first drive beam 50 that performs a resonant drive, by forming the curved shape part 53 cutting inward at a position near the movable frame 60 but not reaching the movable frame 60, it is possible to prevent a stress concentration on the supporting point 64 of a border between the movable frame 60 and the first drive beam 50, to prevent the oxide film 61 of the movable frame 60 from being damaged, and to keep a drive frequency constant.

Figure 25A:
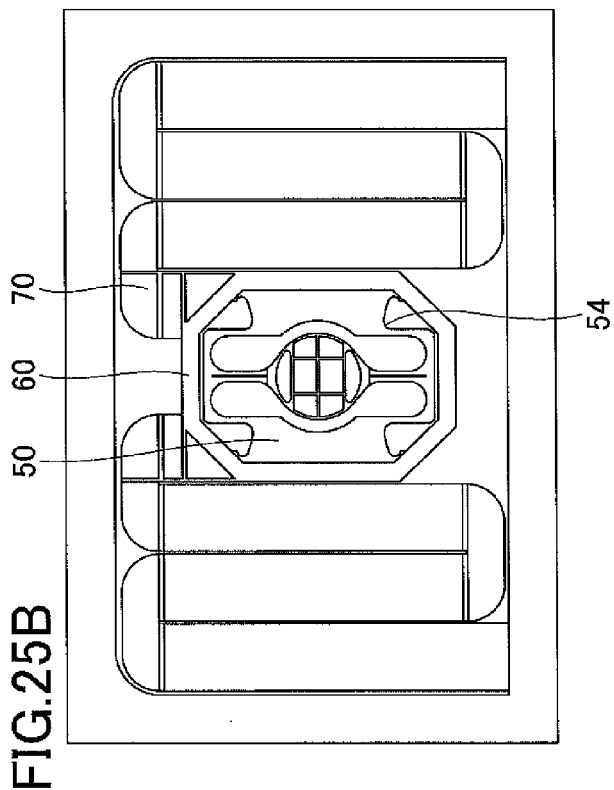
FIG. 25A is a plan view showing the upper side of an optical scanning device of a first embodiment including first and second frequency change prevention structures.
Figure 25B:
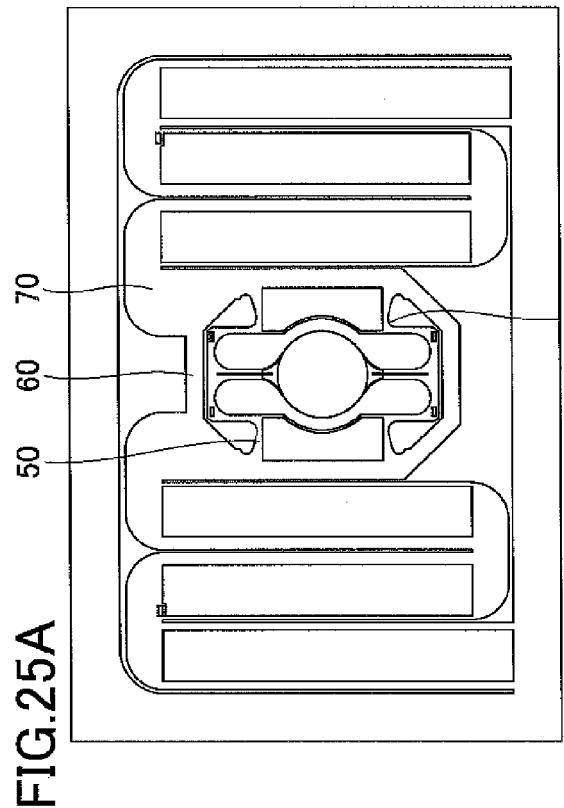
FIG. 25B is a plan view showing the back side of the optical scanning device of the first embodiment including the first and second frequency change prevention structures.

FIGS. 25A through 25D are views to illustrate an optical scanning device of the first embodiment further including a second frequency change prevention structure adding to the first frequency change prevention structure. FIG. 25A is a plane configuration view on the upper side of the optical scanning device of the first embodiment including the first and second frequency change prevention structure. FIG. 25B is a plane configuration view on the back side of the optical scanning device of the first embodiment including the first and second frequency change prevention structure. In FIGS. 25A and 25B, a planar shape of the first drive beams 50 differs from the shape shown in FIGS. 22 and 23 in that sides of the first drive beam 50 include not only the curved shape part 53 but also a constricted part 54 that cuts toward the mirror 10. In this way, by providing not only the curved shape part 53 but also the constricted part 54 that cuts inward, the stress of the first drive beam 50 can be further moved inward and dispersed.

Figure 25D:
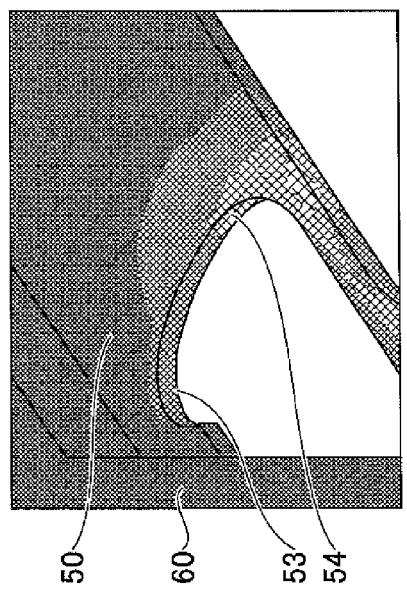
FIG. 25D is an enlarged view showing a stress distribution of a lateral edge of the first drive beam of the optical scanning device of the first embodiment.
Figure 25C:
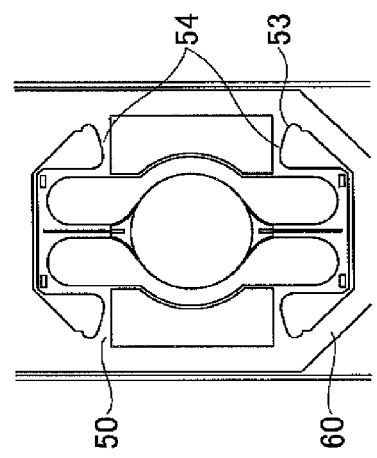
FIG. 25C is an enlarged plan view showing an inside of a movable frame of the optical scanning device of the first embodiment.

FIG. 25C is an enlarged plan view showing an inside of the movable frame 60 of the optical scanning device of the first embodiment. FIG. 25D is an enlarged view showing a stress distribution of a side part of the first drive beam 50. As shown in FIG. 25C, with respect to the first drive beam 50, the curved shape part 53 and the constricted part 54 continue and form the side part of the first drive beam 50. Also, as shown in FIG. 25D, by providing the constricted part 54 on the coupling beam 40 side near the mirror 10, the stress is shifted toward the constricted part 54, and the stress is remarkably reduced in the root of the movable frame 60 side. In other words, by forming the constricted part 54 distant from the supporting point 64 of the movable frame 60, the stress in the supporting point 64 can be widely moved to the constricted part and can be distinctly reduced.

Figure 26A:
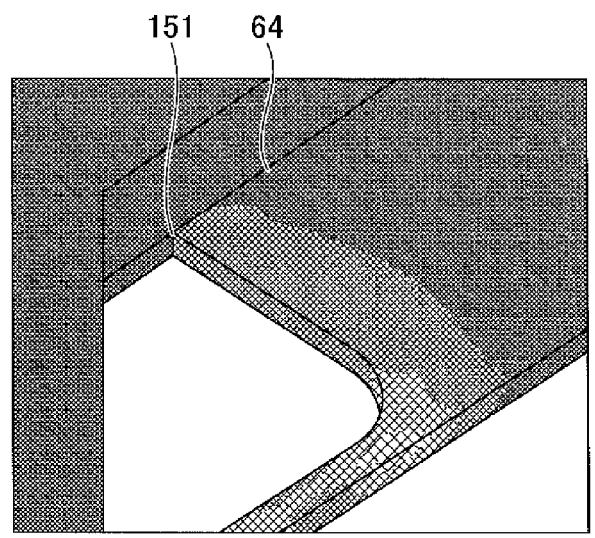
FIG. 26A is a stress distribution map of an optical scanning device without a frequency change prevention structure.
Figure 26B:
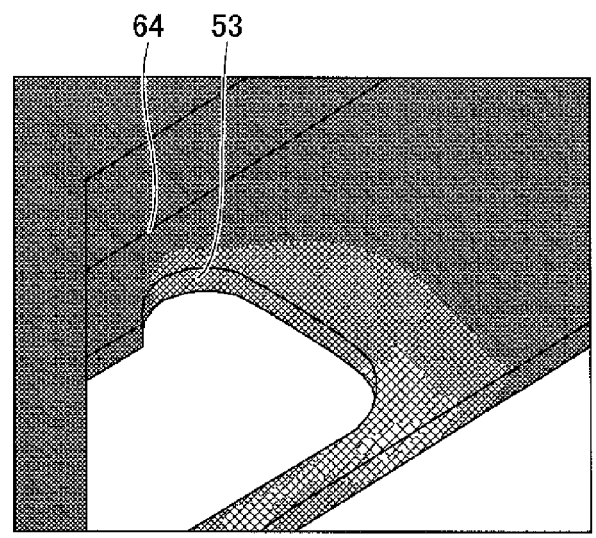
FIG. 26B is a stress distribution map of an optical scanning device with only a first frequency change prevention structure.
Figure 26C:
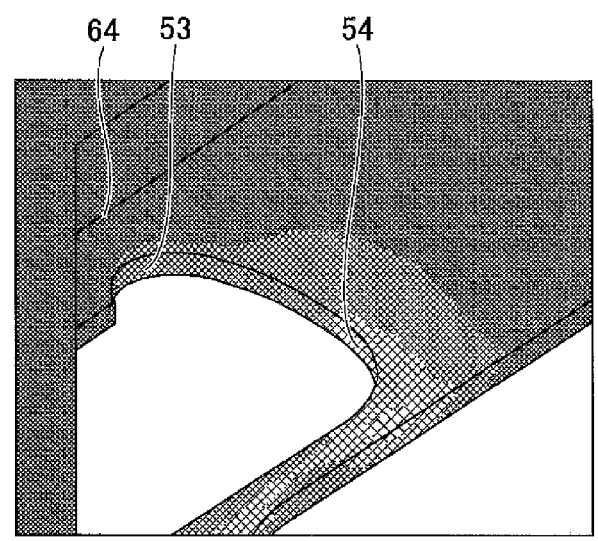
FIG. 26C is a stress distribution map of an optical scanning device of a first embodiment with first and second frequency change prevention structures.

FIGS. 26A through 26C are views showing stress distributions of optical scanning devices of respective embodiments in a comparative way. FIG. 26A is a view showing a stress distribution of an optical scanning device without a frequency change prevention structure. FIG. 26B is a view showing a stress distribution of an optical scanning device with only a first frequency change prevention structure. FIG. 26C is a view showing a stress distribution of an optical scanning device with the first and second frequency change prevention structures.

In FIG. 26A, a stress is applied to the supporting point 64 that is a root of the resonant drive beam 150, and a stress distribution that may cause damage is shown.

On the other hand, in FIG. 26B, by providing the curved shape part 53 more inward than the supporting point 64, a stress is generated more inward than in the curved shape part 53, and the stress reaching the supporting point 64 can be prevented.

Furthermore, in FIG. 26C, by providing the constricted part 54 on the mirror 10 side, which is the coupling beam 40 side, stress is moved to the constricted part 54, and the stress is hardly generated more to the exterior than the curved shape part 53.

Figure 27:
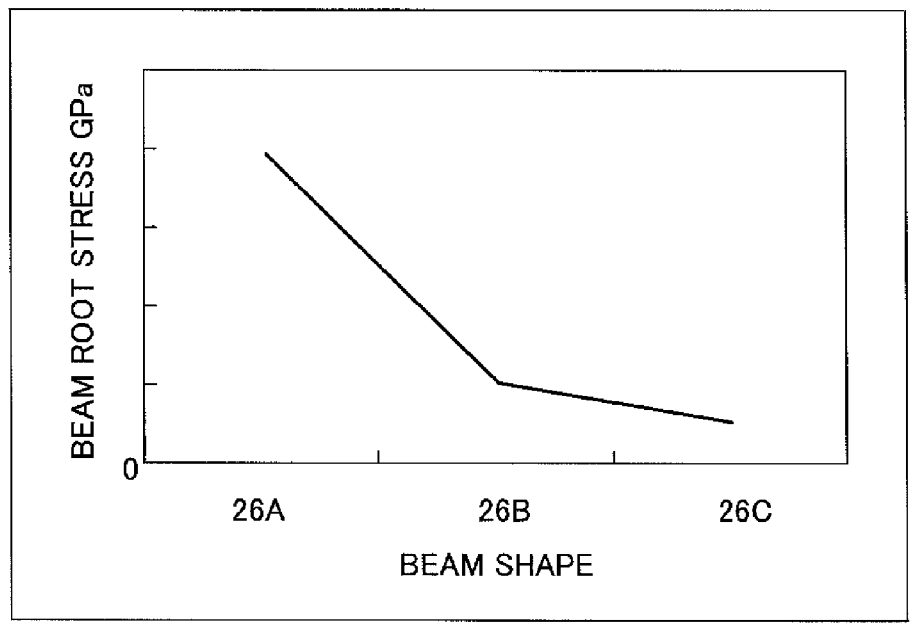
FIG. 27 is a view showing stress measurement results in a root of the first drive beam with respect to each frequency change prevention structure shown in FIGS. 26A through 26C.

FIG. 27 is a graph showing stress measurement results in the supporting point of the first drive beam 50 of the respective frequency change prevention structures shown in FIGS. 26A through 26C. As shown in FIG. 27, compared to the beam shape without the frequency change prevention structure of FIG. 26A, by providing the first frequency change prevention structure, the beam shape of FIG. 26B greatly decreases the root stress. In addition, by further providing the second frequency change prevention structure, the beam shape of FIG. 26C further decreases the generated stress in the root than does the beam shape of FIG. 26B.

In this manner, by providing the frequency change prevention structure of the curved shape part 53 and the constricted part 54 for the first drive beam 50, destruction of the oxide film 61 of the supporting point 64 of the movable frame 60 can be prevented, and the optical scanning device can be driven by keeping the frequency constant even if driven continuously for a long time.

Second Embodiment

Figure 28:
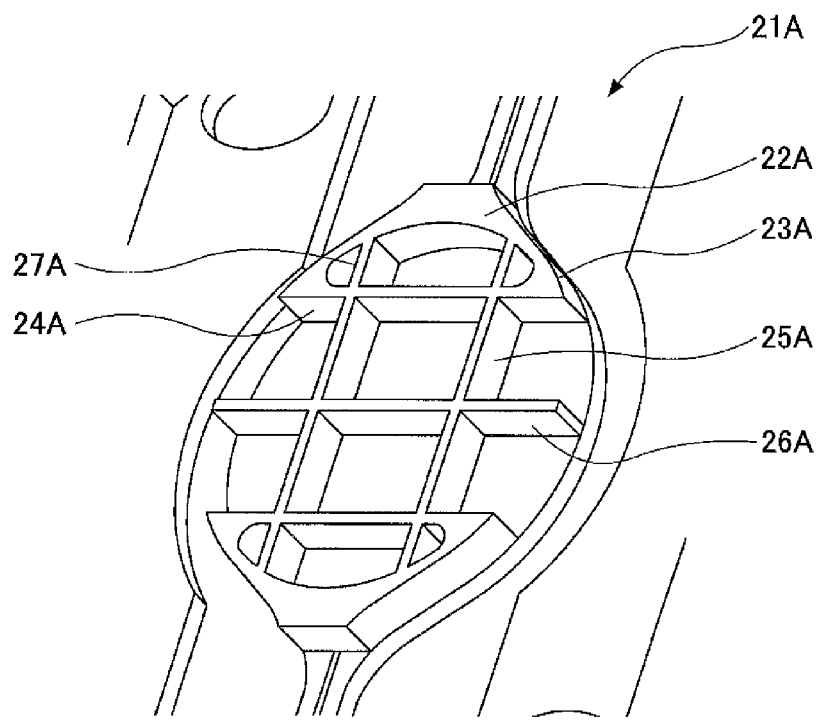
FIG. 28 is a view showing an example of an optical scanning device of a second embodiment.

FIG. 28 is a view showing an example of an optical scanning device of a second embodiment. In the optical scanning device of the second embodiment, only a structure of a rib 21A provided on the back side of the mirror supporting part 20 differs from the optical scanning device of the first embodiment. Hence, with respect to the other components, the same numerals as the description hereinbefore are used and the descriptions are omitted.

The rib 21A of the optical scanning device of the second embodiment includes coupling ribs 22A, arc-like ribs 23A, chordal ribs 24A, longitudinal ribs 25A, and a transverse rib 26A, which have a similar structure to those in the optical scanning device of the first embodiment. The optical scanning device of the second embodiment differs from that of the first embodiment in that penetration ribs 27A extended from the longitudinal rib 25A cross the chordal ribs 24A, and further reach the inside wall of the arc-like ribs 23A.

According to the optical scanning device of the second embodiment, by further providing the penetration ribs 27A that penetrate the chordal ribs 24A and reach the arc-like ribs 23A, deformation of the mirror 10 can be further reduced.

Third Embodiment

Figure 29:
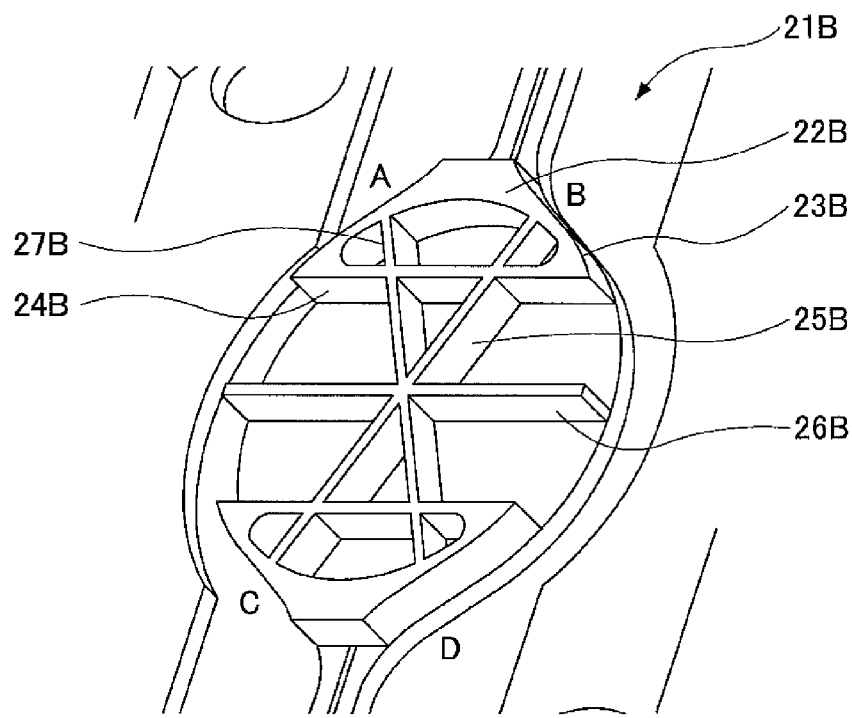
FIG. 29 is a view showing an example of an optical scanning device of a third embodiment.

FIG. 29 is a view showing an example of an optical scanning device of a third embodiment. The optical scanning device of the third embodiment differs from that of the first embodiment in that a rib 21B includes longitudinal ribs 25B and penetration ribs 27B that connect a point A with a point D, and a point B with a point C respectively and form a shape crossing in an X-like shape. Since the other coupling ribs 22B, arc-like ribs 23B, chordal ribs 24B and transverse ribs 26B have a configuration similar to corresponding ribs of the optical scanning device of the second embodiment, the descriptions are omitted.

According to the optical scanning device of the third embodiment, implementing a mirror deformation prevention structure strong against diagonal stress is possible.

Fourth Embodiment

Figure 30:
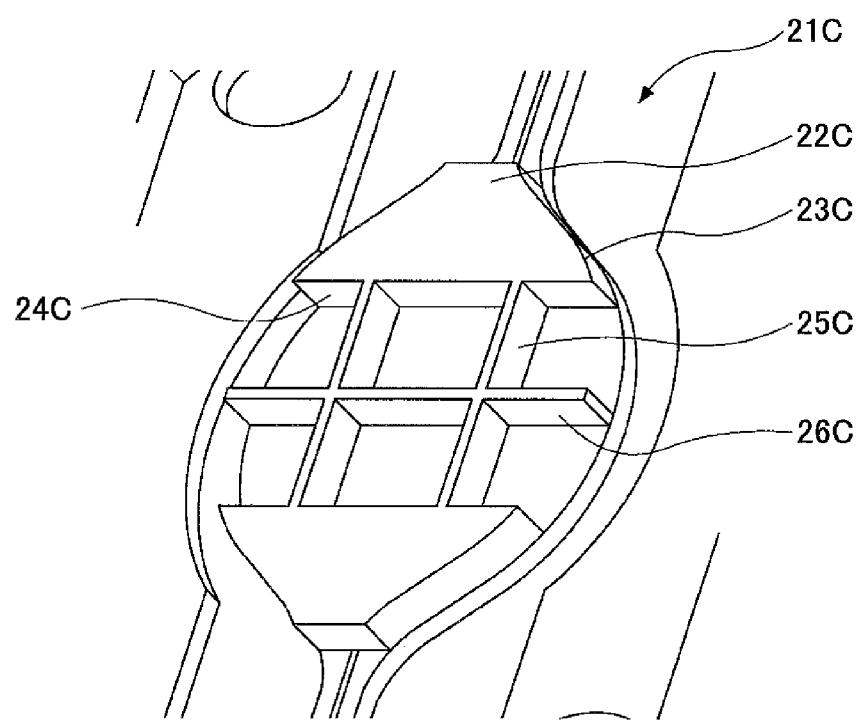
FIG. 30 is a view showing an example of an optical scanning device of a fourth embodiment.

FIG. 30 is a view showing an example of an optical scanning device of a fourth embodiment. The optical device of the fourth embodiment differs from those of the first and second embodiments in that a rib 21C includes connecting ribs 22C, arc-like ribs 23C and chordal ribs 24C that are formed as a single large mass. In this manner, constructing the connecting ribs 22C in an integrated manner with the arc-like rib 23C and the chordal rib 24C is possible. Because the mirror supporting part 20 is reinforced more solidly, an effect of preventing the mirror deformation can be certainly enhanced. Here, since the configuration of the longitudinal ribs 25C and the transverse ribs 26C is similar to those of the first and second embodiments, the descriptions are omitted.

Fifth Embodiment

Figure 31:
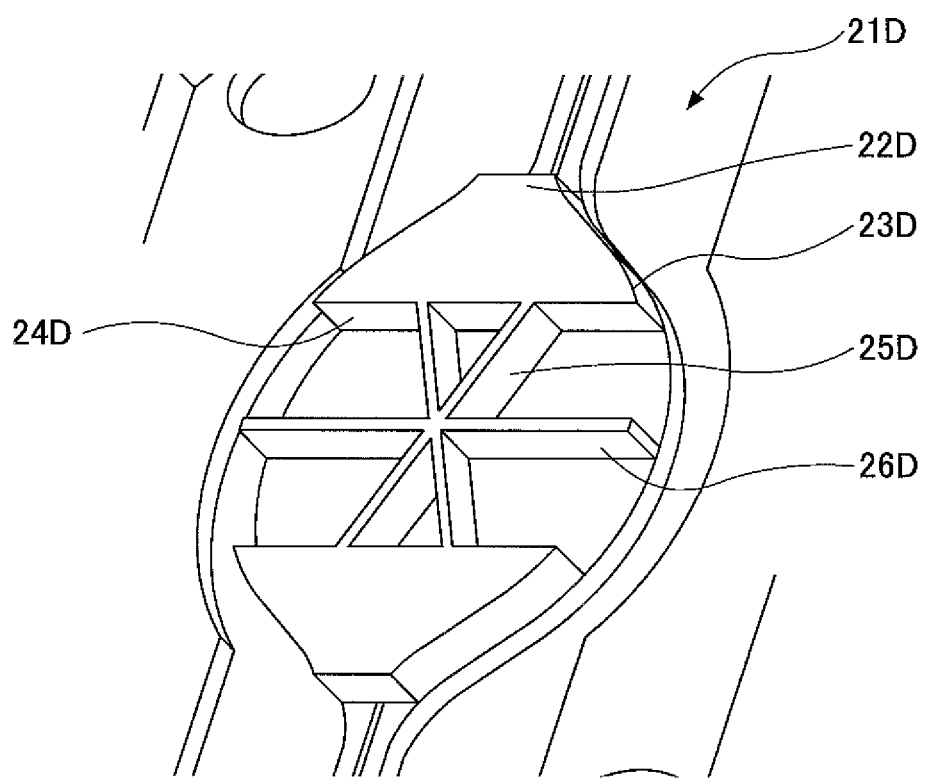
FIG. 31 is a view showing an example of an optical scanning device of a fifth embodiment.

FIG. 31 is a view showing an example of an optical scanning device of a fifth embodiment. The optical scanning device of the fifth embodiment differs from that of the third embodiment in that a rib 21D includes connecting ribs 22D, arc-like ribs 23D and chordal ribs 24D that are formed as a single large mass. In this case also, because the mirror supporting part 20 is reinforced more solidly, an effect of preventing the mirror deformation can be surely improved. Here, since the configuration of the longitudinal ribs 25D and the transverse ribs 26D are similar to that of the third embodiment, the descriptions are omitted.

In this way, according to embodiments of the present invention, it is possible to reduce generation of a nonlinear oscillation and to prevent a mirror deformation.

The embodiments of the present invention can be applied to an image projection apparatus such as a projector that projects an image by deflecting light.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An optical scanning device, comprising:
   a mirror configured to reflect laser light;
   a mirror supporting part configured to support the mirror;
   a pair of torsion beams configured to support the mirror supporting part on both sides in a direction of an axis thereof and to be twisted to swing the mirror supporting part around the axis; and
   a rib provided on a back surface of the minor supporting part, the rib including a longitudinal part provided in a direction parallel to the axis.

2. The optical scanning device as claimed in claim 1, wherein the rib further includes an arc part configured to connect edge portions of the longitudinal part.

3. The optical scanning device as claimed in claim 1, wherein the rib includes a part provided in a direction orthogonal to the direction of the axis.

4. The optical scanning device as claimed in claim 1, wherein the rib further includes a transverse part extending through a center of the mirror supporting part in a direction orthogonal to the direction of the axis.

5. An optical scanning device, comprising:
   a mirror;
   a mirror supporting part configured to support the mirror;
   a pair of torsion beams configured to support the mirror supporting part on both sides in a direction of an axis thereof and to be twisted to swing the mirror supporting part around the axis;
   a movable frame configured to surround the minor, the mirror supporting part and the pair of torsion beams;
   a pair of first drive beams, the first drive beams having first edges connected to and supported by inside walls of the movable frame and being configured to generate a driving force to swing the mirror supporting part in a first direction; and
   coupling beams to couple second edges of the first drive beams with the torsion beams and to transmit the driving force to the torsion beams,
   wherein a planar shape of each first drive beam includes a curved shape part cut inward at a position on a side connecting the movable frame with each coupling beam and near the movable frame.

6. The optical scanning device as claimed in claim 5, wherein the planar shape of each first drive beam includes a part cut most inward at a position on the side near the coupling beam.

7. An optical scanning device, comprising:
   a mirror;
   a mirror supporting part configured to support the mirror;
   a pair of torsion beams configured to support the mirror supporting part on both sides in a direction of an axis thereof and to be twisted to swing the mirror supporting part around the axis;
   a movable frame configured to surround the mirror, the mirror supporting part and the pair of torsion beams;
   a pair of first drive beams configured to generate a driving force to swing the mirror supporting part around a first axis thereof;

second drive beams coupled to the movable frame from an outside thereof and configured to swing the mirror supporting part around a second axis through the movable frame; and a rib crossing in a direction of the first axis and a direction of the second axis on a back surface of a coupling part between the movable frame and each second drive beam.

8. The optical scanning device as claimed in claim 7, wherein the movable frame includes an outer wall extending in a direction different from the direction of the first axis and the direction of the second axis, and wherein the outer wall and the rib form a triangular hollow.

9. The optical scanning device as claimed in claim 7, wherein each first drive beam generates a driving force by resonant oscillation and each second drive beam generates a driving force by non-resonant oscillation.

* * * * *